United States Patent [19]
Gossett

[11] Patent Number: 6,104,415
[45] Date of Patent: Aug. 15, 2000

[54] METHOD FOR ACCELERATING MINIFIED TEXTURED CACHE ACCESS

[75] Inventor: Carroll Philip Gossett, Mountain View, Calif.

[73] Assignee: Silicon Graphics, Inc., Mountain View, Calif.

[21] Appl. No.: 09/048,024

[22] Filed: Mar. 26, 1998

[51] Int. Cl.[7] ........................................ G09G 5/00
[52] U.S. Cl. .............. 345/513; 345/430; 345/515; 345/521
[58] Field of Search ................... 345/430, 501, 345/507–509, 513, 515, 516, 521

[56] References Cited

U.S. PATENT DOCUMENTS

| 5,760,783 | 6/1998 | Migdal et al. | 345/430 |
|---|---|---|---|
| 5,798,762 | 8/1998 | Sfarti et al. | 345/420 |
| 5,831,624 | 11/1998 | Tarolli et al. | 345/430 |

OTHER PUBLICATIONS

U.S. application No. 08/956,537, Gossett et al., filed Oct. 23, 1997

U.S. application No. 09/048,098, Gossett, filed Mar. 26, 1998.

U.S. application No. 09/048,099, Gossett et al., filed Mar. 26, 1998.

Open GL Reference Manual, The Official Reference Document for Open GL, Release 1 by the Open GL Architecture Review Board, Addison–Wesley Publishing Company, 1992, Table of Contents (pp. vii–ix), pp. 1–26, and diagram entitled "The OpenGL Machine".

Open GL Programming Guide, Jackie Neider, Tom Davis and Mason Woo, Addison–Wesley Publishing Company, 1993, Table of Contents (pp. xv–xxiii), pp. 259–290, 412–415, and 491–504.

Principles of Interactive Computer Graphics, Second Edition, William M. Newman and Robert F. Sproull, McGraw–Hill Book Company, 1979, Table of Contents (pp. vii–xii), pp. 3–8, and 406–408.

The OpenGL Graphics System: A Specification (Version 1.1), Mark Segal, Kurt Akeley; Editor: Chris Frazier, Table of Contents (pp. i–iv), pp. 9–11, 67, 68, and 85–105; unpublished; dated Mar. 4, 1997; Silicon Graphics, Inc.

Computer Graphics, Principles and Practice, Second Edition in C, James D. Foley, Andries van Dam, Steven K. Feiner, and John F. Hughes, Addison–Wesley Publishing Company, Jul. 1997, Table of Contents (pp. xvii–xxiii), pp. 38–40, 67–227 (including plates I.1–I.34), 229–283, 471–531, 611, 614, 616–647(including plates II.1–11.39), 741–745, 800, 805–853 (including plates III.1–III.28), 855–922, 923–1006, 1015–1018, and 1083–1112.

Open GL Programming Guide, Second Edition, The Official Guide to Learning Open GL, Version 1.1, Mason Woo, Jackie Neider, and Tom Davis, Addison–Wesley Developers Press, Jul. 1997, Table of Contents (pp. v–xv), pp. 1–14, 317–373, 529–553 and 609–627.

*Primary Examiner*—Kee M. Tung
*Attorney, Agent, or Firm*—Staas & Halsey

[57] ABSTRACT

A method of a computer graphics system accelerates minified texture cache access by determining a starting address of a texture in s and t coordinates and a level of detail (LOD) of the texture. The texture includes tiles of texels stored in a memory. Then, the method of the present invention reads a succession of each of the tiles of the texture from the memory based on the starting address of a first of the succession of tiles. For each tile in the succession of tiles, each texel in the succession of texels being read is a distance of $2^{LOD}$ texels from a previous texel in the succession of texels.

22 Claims, 13 Drawing Sheets

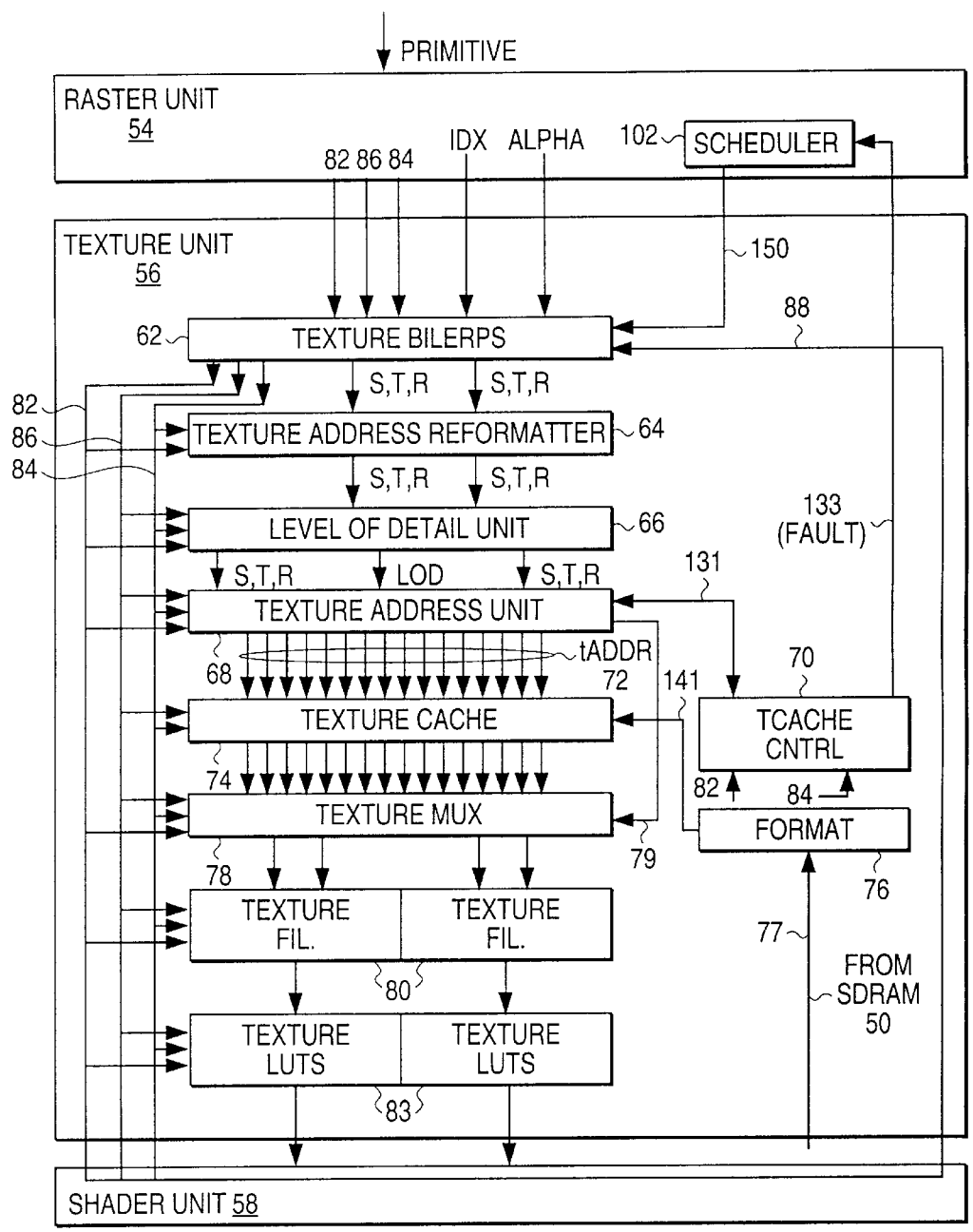

METHOD FOR ACCELERATING MINIFIED TEXTURED CACHE ACCESS

CROSS-REFERENCE TO RELATED APPLICATIONS

This application is related to U.S. patent application Ser. No. 09/048,098, entitled A Method for Improving Texture Locality for Pixel Quads by Diagonal Level-of-Detail Calculation, by Carroll Philip Gossett (Docket No. 1252.1011/15-4-567.00), filed concurrently herewith and which is incorporated herein by reference; U.S. patent application Ser. No. 09/048,099, entitled A Method for Efficient Handling of Texture Cache Misses by Recirculation by Carroll Philip Gossett, Mark Goudy, and Ole Bentz (Docket Number 1252.1012/15-4-561.00), filed concurrently herewith and which is incorporated herein by reference; and U.S. patent application Ser. No. 08/956,537, entitled A Method and Apparatus for Providing Image and Graphics Processing Using A Graphics Rendering Engine, filed Oct. 23, 1997 and which is incorporated herein by reference.

BACKGROUND OF THE INVENTION

1. Field of the Invention

The present invention is related to computer graphics hardware for which OPENGL (GRAPHICS LIBRARY) software is an interface thereto, and, in particular, to accelerating minified texture cache access of the computer graphics hardware.

2. Description of the Related Art

Interactive graphics display, in general, is explained in *Computer Graphics: Principles and Practices*, Foley, vanDam, Feiner, and Hughes, Addison-Wesley, 1992, and in *Principles of Interactive Computer Graphics*, William M. Newman and Robert F. Sproull, Second Edition, McGraw-Hill Book Company, New York, 1979. Interactive graphics display generally includes a frame buffer storing pixels (or picture elements), a display, and a display controller that transmits the contents of the frame buffer to the display.

The OpenGL graphics system is a software interface to graphics hardware, and is explained in the *OpenGL Programming Guide, The Official Guide to Learning OpenGL, Second Edition, Release 1.1*, by the OpenGL Architecture Review Board, Jackie Neider, Tom Davis, Mason Woo, Addison-Wesley Developers Press, Reading, Massachusetts, 1997, in the *OpenGL Programming Guide, The Official Guide to Learning OpenGL, Release 1*, by the OpenGL Architecture Review Board, Jackie Neider, Tom Davis, Mason Woo, Addison-Wesley Publishing Company, Reading, Massachusetts, 1993, and in the *OpenGL Reference Manual, The Official Reference Document for OpenGL, Release 1*, the OpenGl Architecture Review Board, Addison-Wesley Publishing Company, Reading, Massachusetts, 1993.

A computer model for interpretation of OpenGL commands is a client-server model. An application program being executed by one computer, typically the client computer, issues commands, which are interpreted and processed by another computer, typically the server computer, on which OpenGL is implemented. The client may or may not operate on the same computer as the server. A computer, then, can make calls through an OpenGL software interface to graphics hardware, and the graphics hardware can reside either on the same computer making the calls or on a remote computer.

A tool for describing how data is processed in OpenGL is a processing pipeline. The OpenGL processing pipeline 10 shown in FIG. 1 receives commands, and may store the commands for future processing in a display list 14 or execute the commands immediately. The OpenGL processing pipeline includes an evaluator 16, which approximates curve and surface geometry by evaluating polynomial commands of the input values; per-vertex operations and primitive assembly 18, in which geometric primitives such as points, line segments, and polygons, described by vertices, are processed, such as transforming and lighting the vertices, and clipping the primitives into a viewing volume; rasterization 20 produces a series of frame buffer addresses and associated values, and converts a projected point, line, or polygon, or the pixels of a bitmap or image, to fragments, each corresponding to a pixel in the framebuffer; per-fragment operations 22 performs operations such as conditional updates to the frame buffer 24 based on incoming and previously stored depth values (to effect depth buffering) and blending of incoming pixel colors with stored colors, masking, and other logical operations on pixel values. The final pixel values are then stored in the frame buffer 24.

Pixel operations 26 processes input data from the commands 12 which is in the form of pixels rather than vertices. The result of the pixel operations 26 is stored in texture memory 28, for use in rasterization 20. The resulting fragments are merged into the frame buffer 24 as if the fragments were generated from geometric data.

In addition, if texturing is enabled during rasterization 20, a texel is generated from texture memory 28 for each fragment and applied to the fragment. A texel is a texture element obtained from texture memory and represents the color of the texture to be applied to a corresponding fragment. Texturing maps a portion of a specified texture image onto each primitive. Texture mapping is accomplished by using the color (Red (R), Green (G), Blue (B), or Alpha (A)) of the texture image at the location indicated by the fragment's (s, t, and r) coordinates. In the case of a 2-dimensional image (2-D image), s and t coordinates are applicable, and in the case of a 3-dimensional image (3-D image), then s, t, and r coordinates are applicable.

OpenGL provides a way to specify the details of how texturing of a primitive is effected. These details include specification of the image to be texture mapped, the means by which the image is filtered when applied to the primitive, and the function that determines what RGBA value is produced given a fragment color and an image value. A command specifying the target, level, internal format, width, height, border, format, type, and *data (a pointer to the data) is used to specify the texture image in GI, commands such as TexImage2D or TexImage1D. The level argument is an integer level-of-detail number. The main texture image has a level of detail number of 0, and if a level of detail less than 0 is specified, an error message is generated.

The maximum allowable width or height of the image is an implementation dependent function of the level of detail and internal format of the resulting image array. An image with zero height or width indicates the null texture. If the null texture is specified for level of detail zero, it is as if texturing were disabled.

The image indicated to the GL (or graphics library) by the image pointer is decoded and copied into the GL's internal memory. This copying effectively places the decoded image inside a border of the maximum allowable width, which is currently 1, whether or not a border has been specified.

An example of a texture image 29 and the coordinates used to access it is shown in FIG. 2. FIG. 2 shows a two-dimensional texture image with n×m dimensions of n=3 and m=2. A one-dimensional texture would comprise a single strip. The values, α and β, used in blending adjacent texels to obtain a texture value are also shown. As shown in FIG. 2, values of s and t coordinates are each in the range of 0.0 to 1.0.

If no border or a border smaller than the maximum allowable width has been specified, then the image is still stored as if it were surrounded by a border of the maximum possible width. Any excess border (which surrounds the specified image, including any border) is assigned unspecified values. A one-dimensional texture has a border only at its left and right ends.

The decoded image is referred to as the texture array. A two-dimensional texture array has width $w_t=2^n+2b_t$ and height $h_t=2^m+2b_t$, where $b_t$ is the maximum allowable border width; and a one-dimensional texture array has width $w_t=2^n+2b_t$ and height $h_t=1$.

Texturing, including determination of the level of detail and selection of a mipmap, of the related art is now discussed, with reference being made to OpenGL commands using the OpenGL command syntax.

Object coordinates (x, y, z, and w) and texture coordinates (s, t, r, and q) are provided for each vertex.

A texel is an element (i,j) of the texture array (for a 1-dimensional array, j is irrelevant). The texture value used in texturing a fragment is determined by that fragment's associated (s,t) coordinates, but as shown in FIG. 2 may not correspond to any actual texel.

Typically, there are 8 neighboring texels for each pixel, which means that 8 texels encompass or surround each pixel.

Texture images may also be specified using image data taken directly from the framebuffer, and rectangular subregions of existing texture images may be respecified.

If texture wrapping for the s or t coordinates is set to be repeated (by setting parameters such as TEXTURE_WRAP_S or TEXTURE_WRAP_T to REPEAT), then the GL ignores the integer part of the s or t coordinates, respectively, using only the fractional part. For a number r, the fractional part is $r-\lfloor r \rfloor$, regardless of the sign of r, and the floor function truncates towards $-\infty$. The parameter CLAMP causes s or t coordinates to be clamped to the range [0,1]. The initial state is for both s and t behavior to be that given by the repeat value.

Applying a texture to a primitive implies a mapping from texture image space to framebuffer image space. In general, this mapping involves a reconstruction of the sampled texture image, followed by a projective warping implied by the mapping to framebuffer space, then a filtering, followed finally by a resampling of the filtered, warped, reconstructed image before applying it to a fragment.

In the GL, this mapping is approximated by one of two simple filtering schemes. One of these schemes is selected based on whether the mapping from texture space to framebuffer space is deemed to magnify or minify the texture image. The choice is governed by a scale factor ρ(x,y) and $\lambda(x,y) \equiv \log_2[\rho(x,y)]$; if λ(x,y) is less than or equal to a constant (the selection of the constant is described herein below) the texture is said to be magnified; if it is greater, the texture is minified. λ is referred to as the level of detail.

Let s(x,y) be the function that associates an s texture coordinate with each set of window coordinates (x,y) that lie within a primitive, and t(x,y) be defined analogously. Let $u(x,y)=2^n S(x,y)$ and $v(x,y)=2^m t(x,y)$ (for a one-dimensional texture, define $v(x,y)\equiv 0$). For a polygon, ρ is given at a fragment with window coordinates (x,y) by $$\rho = \max\left\{\sqrt{\left(\frac{\partial u}{\partial x}\right)^2+\left(\frac{\partial v}{\partial x}\right)^2}, \sqrt{\left(\frac{\partial u}{\partial y}\right)^2+\left(\frac{\partial V}{\partial y}\right)^2}\right\} \qquad (1)$$

where ∂u/∂x indicates the derivative of u with respect to window x, and similarly for the other derivatives. Equation (1) is rotationally invariant, which means that if the image is rotated around, the same level of detail is provided. However, equation (1) is very compute-intensive.

For a line, the formula is $$\rho = \sqrt{\left(\frac{\partial u}{\partial x}\Delta x + \frac{\partial u}{\partial y}\Delta y\right)^2 + \left(\frac{\partial v}{\partial x}\Delta x + \frac{\partial v}{\partial y}\Delta y\right)^2} \Big/ l, \qquad (2)$$

where $\Delta x=x_2-x_1$ and $\Delta y=Y_2-Y_1$ with $(x_1,y_1)$ and $(x_2,y_2)$ being the segment's window coordinate endpoints and $l=\sqrt{\Delta x^2+\Delta y^2}$. For a point, pixel rectangle, or bitmap, $\rho\uparrow 1$.

While equations (1) and (2) give the best results when texturing, they are often impractical to implement. Therefore, an implementation may approximate the ideal ρ with a function f(x,y) subject to these conditions:

1. f(x,y) is continuous and monotonically increasing in each of |∂u/∂y|,|∂v/∂x|, and |∂v/∂y|,
2. Let $$m_u = \max\left\{\left|\frac{\partial u}{\partial x}\right|, \left|\frac{\partial u}{\partial y}\right|\right\} \text{ and } m_v = \max\left\{\left|\frac{\partial v}{\partial x}\right|, \left|\frac{\partial v}{\partial y}\right|\right\}$$

Then max $\{m_u,m_v\} \leq f(x,y) \leq m_u+m_v$. Max$\{m_u,m_v\}$ is the rectangular level of detail calculation, and $m_u+m_v$ is the fuzziest permissible limit, but is very fuzzy.

When λ indicates minification, the value assigned to the TEXTURE_MIN_FILTER parameter is used to determine how the texture value for a fragment is selected. When TEXTURE_MIN_FILTER is NEAREST, the texel nearest (in Manhattan distance) to that specified by (s,t) is obtained. This means the texel at location (i,j) becomes the texture value, with i given by $$i = \begin{cases} \lfloor u \rfloor, s < 1, \\ 2^n - 1, s = 1. \end{cases} \qquad (3)$$

If TEXTURE_WRAP_S is REPEAT, then 0≦s <1. Similarly, j is found as $$j = \begin{cases} \lfloor v \rfloor, t < 1, \\ 2^m - 1, t = 1. \end{cases} \qquad (4)$$

For a one-dimensional texture, j is irrelevant; the texel at location i becomes the texture value.

When TEXTURE_MIN_FILTER is LINEAR a 2×2 square of texels is selected. This square is obtained by first computing $$i_0 = \begin{cases} \lfloor u - 1/2 \rfloor mod 2^n, \text{ TEXTURE\_WRAP\_S is REPEAT,} \\ \lfloor u - 1/2 \rfloor, \text{ TEXTURE\_WRAP\_S is CLAMP} \end{cases}$$

and $$j_0 = \begin{cases} \lfloor v - 1/2 \rfloor mod 2^m, & TEXTURE\_WRAP\_T \text{ is } REPEAT, \\ \lfloor v - 1/2 \rfloor, & TEXTURE\_WRAP\_T \text{ is } CLAMP \end{cases}$$

Then $$i_1 = \begin{cases} (i_0 + 1)mod 2^n, & TEXTURE\_WRAP\_S \text{ is } REPEAT, \\ i_0 + 1, & TEXTURE\_WRAP\_S \text{ is } CLAMP \end{cases}$$

and $$j_1 = \begin{cases} (j_0 + 1)mod 2^m, & TEXTURE\_WRAP\_T \text{ is } REPEAT, \\ j_0 + 1, & TEXTURE\_WRAP\_T \text{ is } CLAMP \end{cases}$$

Let $\alpha = frac(u - \frac{1}{2})$ and $\beta = frac(v - \frac{1}{2})$ where frac(x) denotes the fractional part of x. Let $T_{ij}$ be the texel at location (i,j) in the texture image. Then the texture value, $\tau$ is found as $$\tau = (1-\alpha)(1-\beta)\tau_{i_0 j_0} + \alpha(1-\beta)\tau_{i_1 j_0} + (1-\alpha)\beta\tau_{i_0 j_1} + \alpha\beta\tau_{i_1 j_1} \quad (5)$$

for a two-dimensional texture.

For a one-dimensional texture, $$\tau = (1-\alpha)\tau_{i_0} + \alpha\tau_{i_1} \quad (6)$$

where $\tau_i$ indicates the texel at location i in the one-dimensional texture. If any of the selected $\tau_{ij}$ (or $\tau_i$) in the above equations refer to a border texel with $i < -b_s$, $j < -b_s$, $i \geq w_s - b_s$, or $j \geq h_s - b_s$, then the border color given by the current setting of the parameter TEXTURE_BORDER_COLOR is used instead of the unspecified value or values.

The RGBA values of the TEXTURE_BORDER_COLOR are interpreted to match the texture's internal format in a manner consistent with Table 1.

TABLE 1

| Base Internal Format | RGBA Values | Texture Components |
|---|---|---|
| ALPHA | A | A |
| LUMINANCE | R | L |
| LUMINANCE ALPHA | R,A | L,A |
| INTENSITY | R | I |
| RGB | R,G,B | R,G,B |
| RGBA | R,G,B,A | R,G,B,A |

OpenGL parameters of TEXTURE_MIN_FILTER, including NEAREST_MIPMAP⁻NEAREST, NEAREST_MIPMAP⁻LINEAR, LINEAR_MIPMAP⁻NEAREST, and LINEAR_MIPMAP⁻LINEAR, each require the use of a mipmap. A mipmap is an ordered set of arrays representing the same image; each array has a resolution lower than the previous one. If the texture has dimensions $2^n \times 2^m$, then there are $\max\{n,m\}+1$ mipmap arrays. The first array is the original texture with dimensions $2^n \times 2^m$. Each subsequent array has dimensions $2^{(k-1)} \times 2^{(l-1)}$ where $2^k \times 2^l$ are the dimensions of the previous array. This is the case as long as both $k>0$ and $l>0$. Once either $k=0$ or $l=0$, each subsequent array has dimension $1 \times 2^{(l-1)}$ or $2^{(k-1)} \times 1$, respectively, until the last array is reached with dimension $1 \times 1$.

Each array in a mipmap is transmitted to the GL using TexImage2D or TexImage1D; the array being set is indicated with the level-of-detail argument. Level-of-detail numbers proceed from 0 for the original texture array through $p = \max\{n,m\}$ with each unit increase indicating an array of half the dimensions of the previous one as already described. If texturing is enabled (and TEXTURE_MIN_FILTER is one that requires a mipmap) at the time a primitive is rasterized and if the set of arrays 0 through p is incomplete, based on the dimensions of array 0, then it is as if texture mapping were disabled. The set of arrays 0 through p is incomplete if the internal formats of all the mipmap arrays were not specified with the same symbolic constant, or if the border widths of the mipmap arrays are not the same, or if the dimensions of the mipmap arrays do not follow the sequence described above. Arrays indexed greater than p are insignificant.

The mipmap is used in conjunction with the level of detail to approximate the application of an appropriately filtered texture to a fragment.

Let $p = \max\{n,m\}$ and let c be the value of $\lambda$ at which the transition from minification to magnification occurs, and, for minification, values of $\lambda$ where $\lambda > c$ are applicable. For the NEAREST_MIPMAP⁻NEAREST parameter, if $c < \lambda \leq 0.5$ then the mipmap array with level-of-detail of 0 is selected. Otherwise, the dth mipmap array is selected when $d - \frac{1}{2} < \lambda \leq d + \frac{1}{2}$ as long as $1 \leq d \leq p$. If $\lambda > p + \frac{1}{2}$, then the pth mipmap array is selected. The rules for NEAREST are then applied to the selected array.

The same mipmap array selection rules apply for LINEAR_MIPMAP⁻NEAREST as for NEAREST_MIPMAP⁻NEAREST, but the rules for LINEAR are applied to the selected array.

For NEAREST_MIPMAP⁻LINEAR, the level d−1 and the level d mipmap arrays are selected, where $d-1 \leq \lambda < d$, unless $\lambda \geq p$, in which case the pth mipmap array is used for both arrays. The rules for NEAREST are then applied to each of these arrays, yielding two corresponding texture values $\tau_{d-1}$ and $\tau_d$. The final texture value is then found as $$\tau = [1 - frac(\lambda)]\tau_{d-1} + frac(\lambda)\tau_d \quad (7)$$

LINEAR_MIPMAP⁻LINEAR has the same effect as LINEAR_MIPMAP⁻LINEAR except that the rules for LINEAR are applied for each of the two mipmap arrays to generate $\tau_{d-1}$ and $\tau_d$.

Texture magnification is now explained. When $\lambda$ indicates magnification, the value assigned to TEXTURE_MAG_FILTER determines how the texture value is obtained. There are two possible values for TEXTURE_MAG_FILTER: NEAREST and LINEAR. NEAREST behaves exactly as NEAREST for TEXTURE_MIN_FILTER (equation (3) and (4) are used); LINEAR behaves exactly as LINEAR for TEXTURE_MIN_FILTER (equation (5) is used). The level-of-detail 0 texture array is always used for magnification.

In addition, there is a choice of c, the minification vs. magnification switch-over point. If the magnification filter is given by LINEAR and the minification filter is given by NEARESTτ_MIPMAP⁻NEAREST or NEARESTτ_MIPMAP⁻LINEAR, then c=0.5. This is done to ensure that a minified texture does not appear "sharper" than a magnified texture. Otherwise, c=0.

Multiple levels of detail in OpenGL allow textured objects to be viewed at different distances from a viewpoint by determining which of the mipmap images in a pyramid of mipmaps of the same image to select, and by filtering between 2 levels of detail to minimize aliasing artifacts.

Mipmapping prevents aliasing in texel space and eliminates aliasing artifacts by blurring between levels of detail, one of which is not aliasing and the other of which is slightly aliasing. For example, a brick wall would appear as noise without aliasing if a full resolution image of the brick wall were to be applied to a brick wall that is far enough from the viewer to appear as a single pixel.

The texture coordinates determine what part of the texture in the texture map is assigned to that vertex, with texture coordinates being linearly interpolated between vertices. Texture coordinates include one, two, three, or four coordinates, and are usually referred to as the s, t, r, and q coordinates.

An image can be magnified (enlarged) or minified (reduced in size), and texturing associated with the magnification or minification must be appropriately scaled.

In the related art, for each pixel, the texturing such as the s and t coordinates and the level of detail associated with each pixel must be analyzed to determine the appropriate texturing for the image being scaled and displayed.

Also in the related art, techniques for magnifying and minifying images are implemented as follows. For magnification of images, the texture coordinates are stepped through slowly, without mipmapping, and using bilinear interpolation techniques. For minification of images, a detail texture is to be displayed, and mipmapping is required to prevent aliasing and to limit the size of the footprint of pixels in texture space stored in the texture memory. Therefore, in the related art, trilinear interpolation, involving the s and t coordinates and the level of detail, is required for mipmapping. To avoid aliasing during minification, proper sampling of the texture is required, and, typically, a prefiltered coarse representation of the image is selected and displayed, with smooth interpolation between levels of detail to prevent popping.

Mipmapping can be turned off. However, in some computers available from Silicon Graphics, Inc., a performance penalty is imposed given the architecture thereof.

In particular, if an image is heavily minified, then the texture stored in the texture cache is stepped through at hundreds of texels per pixel or more, fetching an entire tile of texels from the texture memory into the texture cache, but using only a small percentage of that tile is actually used, potentially thrashing the texture cache. The foregoing procedure may result in a performance hit ratio of 100 to 1.

A problem in the related art is that textures in extreme minification are highly non-local, which reduces texture cache performance, degrading texture cache performance by as much as two orders of magnitude.

SUMMARY OF THE INVENTION

The present invention solves the above-mentioned problems of the related art.

An object of the present invention is to create fake mipmap levels by a dithered sub-sampling of the original texture on the way to being stored in the texture cache.

Another object of the present invention is to provide the visual effect of minified non-mipmapped, aliased textures, without suffering the performance inefficiency that a typical texture cache would suffer upon extreme minification.

The present invention overcomes the problems in the related art and accomplishes the above-mentioned objects.

The present invention creates fake mipmap levels by a dithered subsampling of the original texture on the way from the texture memory to the texture cache, providing the visual effect of minified, non-mipmapped, but aliased, textures, without suffering the performance inefficiency that a typical texture cache would suffer upon extreme minification.

The present invention solves a potential cache-busting situation which would befall a related-art implementation of a texture cache in extreme minification. Accordingly, the present invention maintains the efficiency of the texture cache, even in cache-busting minification cases.

To accomplish the above-mentioned objects, the present invention is a method for accelerating minified texture cache access. The method of the present invention minifies a non-mipmapped texture by striding through texels at intervals based on a level-of-detail value determined as though mipmapping were enabled. The present invention is implemented on an OpenGL-compliant, dedicated hardware display controller.

These together with other objects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 5 is a detailed diagram of a texture unit of the present invention;

DESCRIPTION OF THE PREFERRED EMBODIMENTS

The present invention resides in a single-chip implementation of OpenGL, in which matrices are composed on a host computer and evaluated on the single chip.

Figure 1:
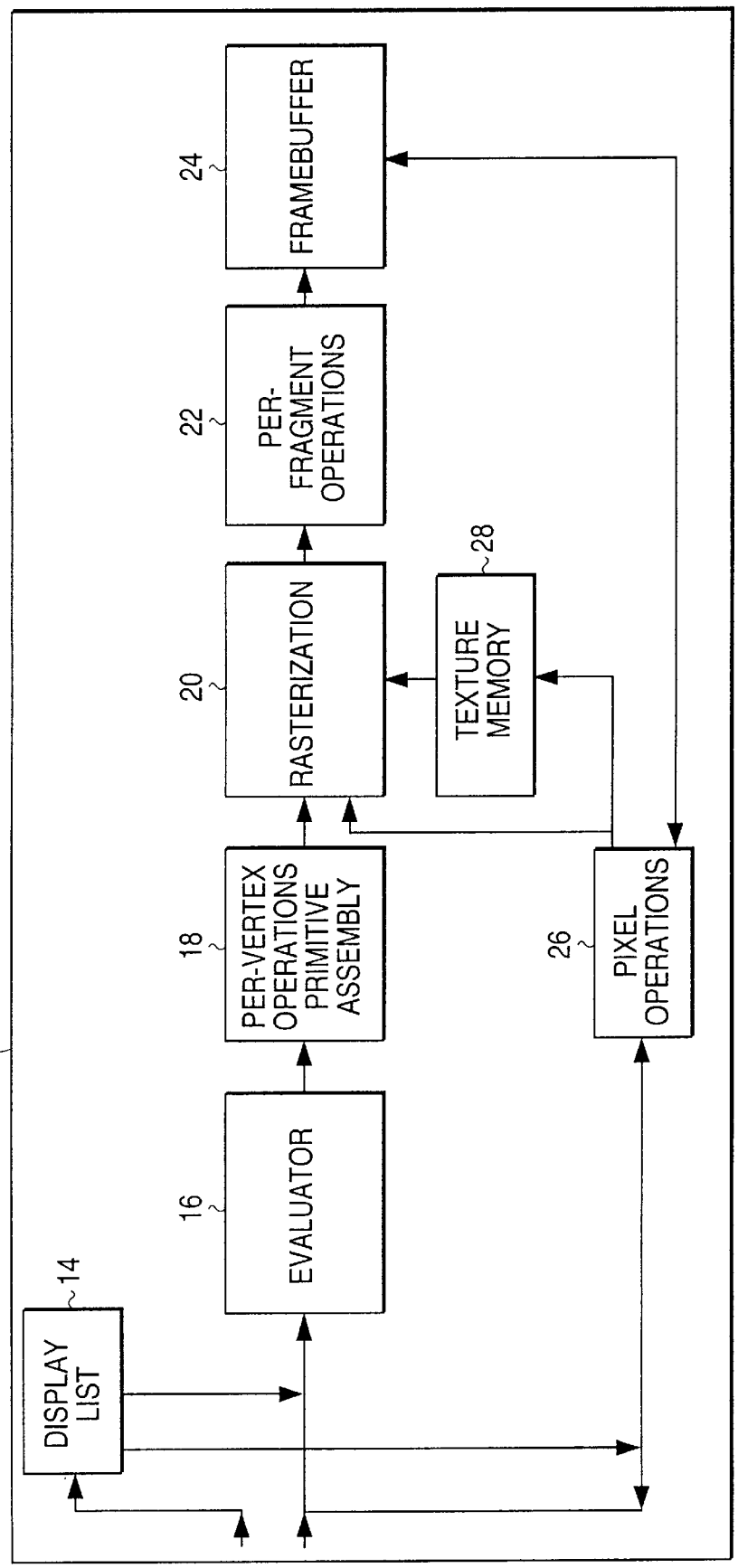
FIG. 1 is a diagram of an OpenGL processing pipeline of the related art.
Figure 2:
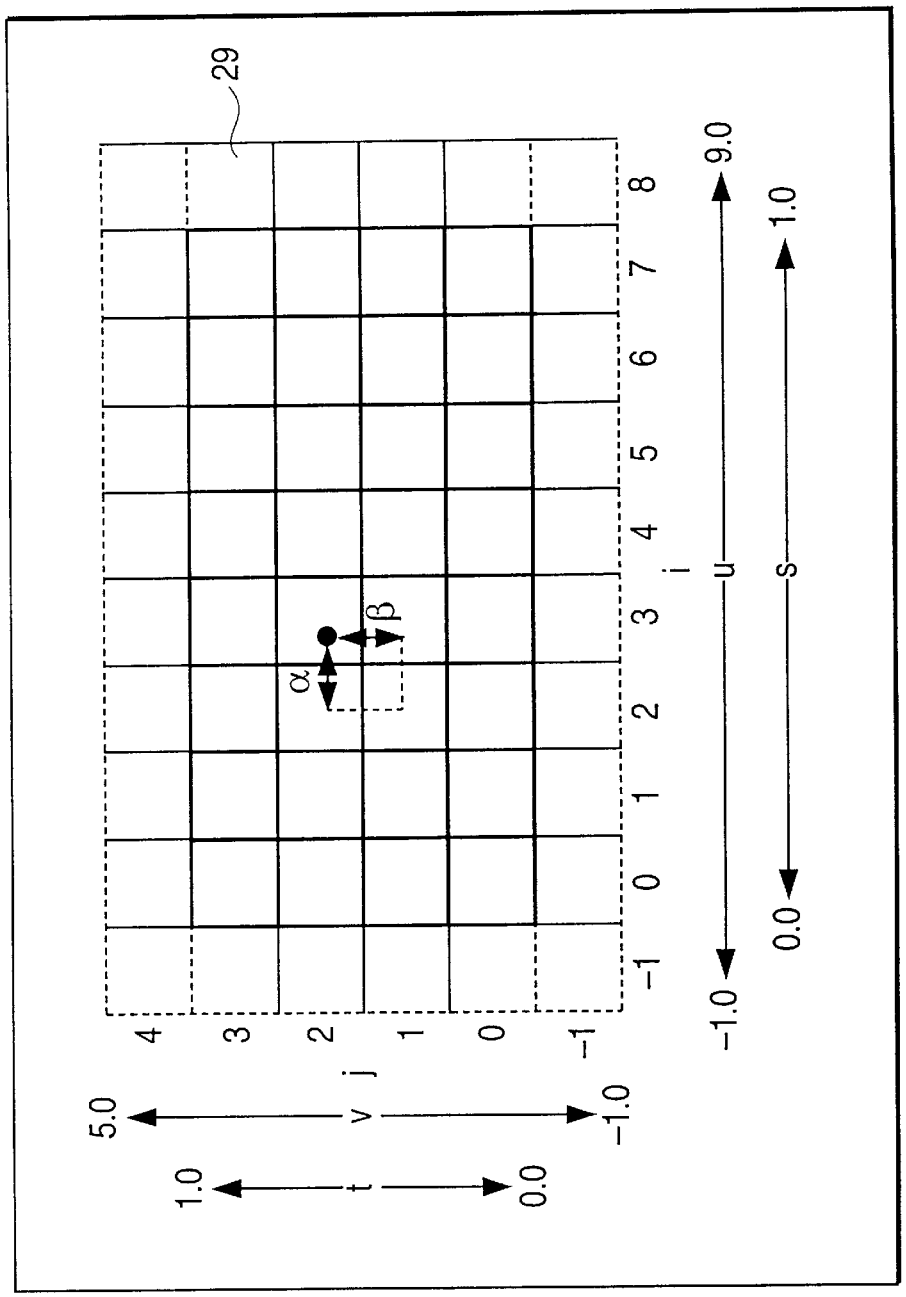
FIG. 2 is a diagram of a texture image and the coordinates used to access it.
Figure 3:
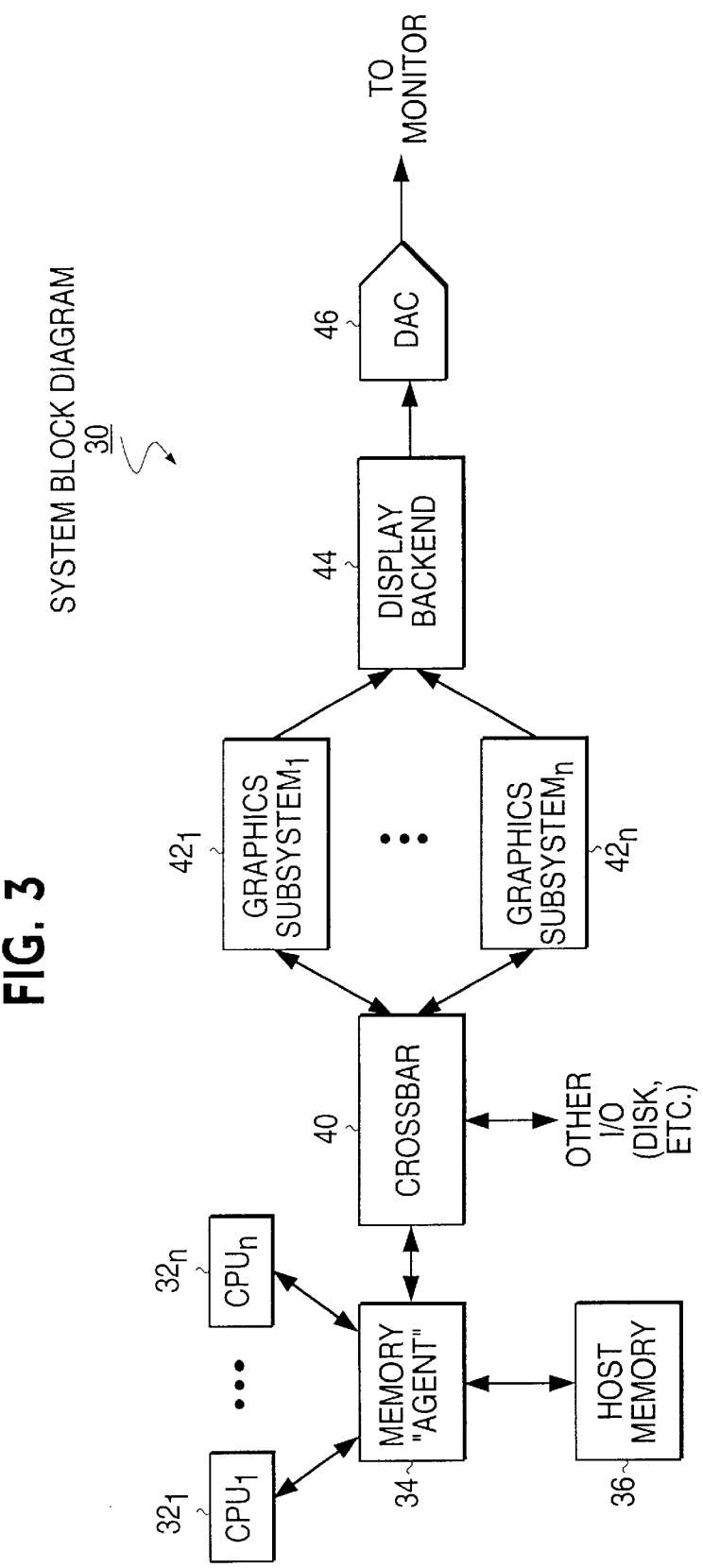
FIG. 3 is a block diagram of a graphics system according to the present invention.

As shown in FIG. 3, in the graphics system 30 according to the present invention, central processing units (CPUs) $32_1$ through $32_n$, execute OpenGL software commands 12 (not shown in FIG. 3), using memory agent 34 and host memory 36. A command stream, which is analogous to subroutine calls calling an OpenGL API library, is pushed immediately by the CPU to be executed by the hardware implementing the OpenGL system, and, accordingly, a push model is representative of the OpenGL system.

The memory agent 34 then transmits the commands 12 to crossbar switch 40. Then, commands 12 are transmitted to graphic subsystems $42_1$ through $42_m$, which process the commands 12 in a token stream (commands, including GL commands, are mapped to integer tokens), as described in further detail herein below. After graphic subsystems $42_1$ through $42_m$ process the commands 12, a display backend 44 transfers the processed data to digital-to-analog (DAC) converter 46, then to a monitor for display.

Figure 4:
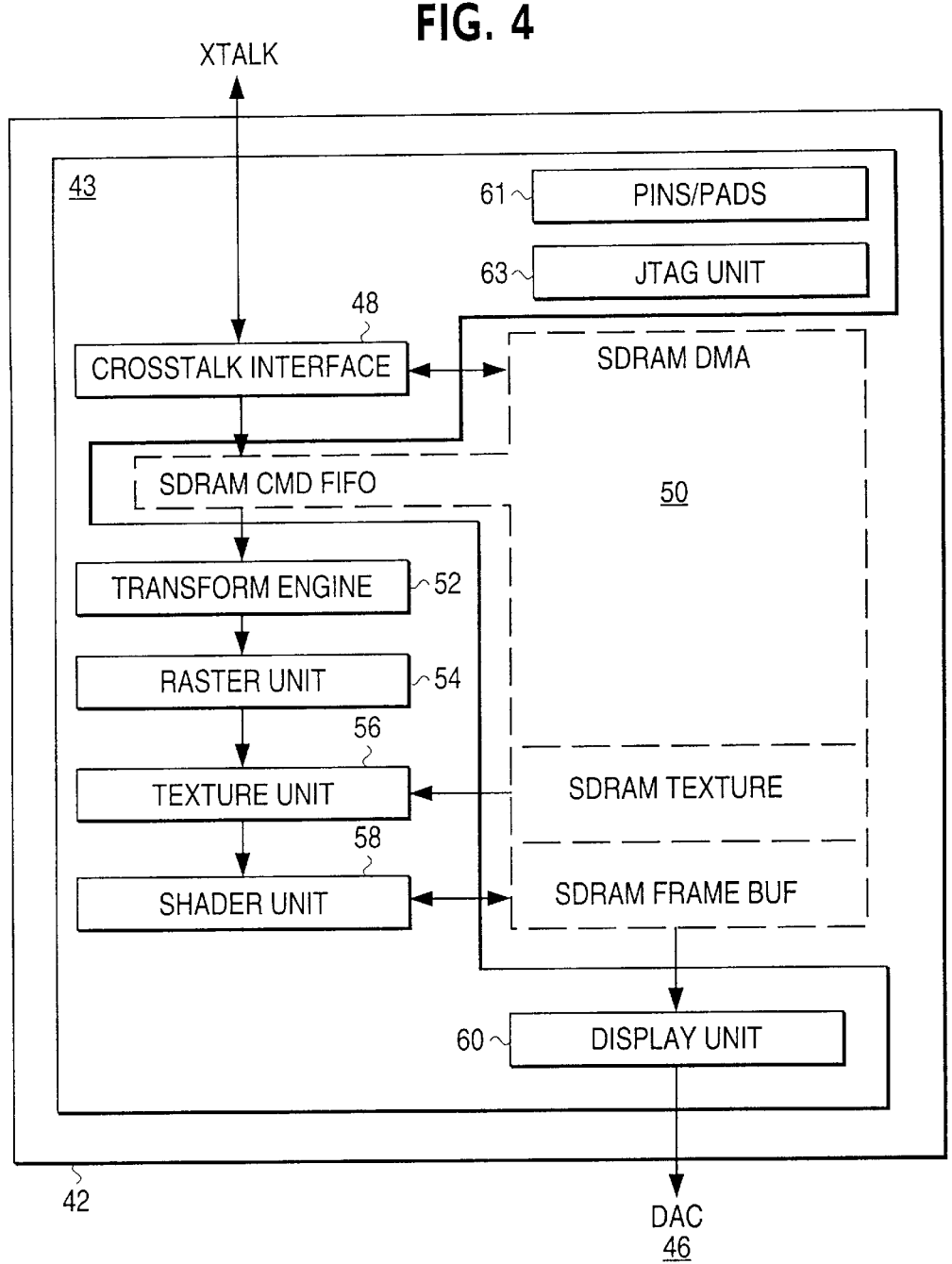
FIG. 4 is a block diagram of a hardware organization of a chip implementing the present invention.

FIG. 4 is a block diagram of a graphic subsystem 42 of the present invention. Graphics subsystem 42 comprises graphics chip 43 and SDRAM 50, coupled to graphics chip 43.

As shown in FIG. 4, CROSSTALK interface 48, which is also referred to as a graphics front end, interfaces to the rest of the graphic system 30 through XTALK (or CROSSTALK). CROSSTALK is a router/connection unit available from Silicon Graphics, Inc. Graphics front end 48 comprises a XTALK peer-to-peer interface, a DMA engine (including formatting), and a command first-in, first-out (fifo) buffer. The command fifo is maintained in SDRAM 50, as shown in FIG. 4. The command fifo is nominally 1 ms. worth of latency.

Graphics front end 48 also directs incoming streams to intended destinations, provides all support for chained graphics subsystems 42 in multi-subsystems 42 configurations, provides access in and out for the SDRAM 50, provides DMA channels for graphics and video, formats input and output streams, manages context switching and context states, provides a read path for graphics registers, and provides access to the display backend 44 through Display Unit 60.

Also as shown in FIG. 4, Transform Engine 52 interfaces to both the graphics front end 48 and the raster unit 54 on a first-in, first-out basis, receives commands and data from the graphics front end 48, and sends computed data to raster unit 54. The main computations performed in the transform engine 52 include geometry transforms of both vertices and normals (MVP and MV matrices). Transform Engine 52 is responsible for all geometry calculations in graphics subsystem 42, including performing vertex transforms and lighting computations for Phong Shading, and Gouraud Shading. In addition, Transform Engine 52 performs texture transform.

Raster unit 54 of FIG. 4 parses command tokens transmitted from the Transform Engine 52, schedules all SDRAM 50 memory transactions, rasterizes each primitive by recursive subdivision, and generates perspective-corrected barycentric parameters which are used to bi-lerp (bilinear interpolate) among the 3 vertices for each triangle. Raster unit 54 also includes the framebuffer cache.

In addition, raster unit 54 includes line and point antialiasing, and the control for a framebuffer cache. Frustum clipping is effectively performed by the recursive subdivision rasterization in raster unit 54, and user clipped planes are performed using the sign bit of the bi-lerps for the texture coordinates to invalidate user-clipped pixels.

Barycentric coordinates for a triangle are a set of three numbers a, b, and c, each in the range of (0,1), with a+b+c=1 and which uniquely specify any point within the triangle or on the triangle's boundary. For example, a point P in a triangle having vertices A, B, and C, and area a from the triangle having vertices P, B, and C (the edge within the triangle opposite from the vertex A), area b from the triangle having vertices P, C, and A (the edge within the triangle opposite from the vertex B), and area c from the triangle having vertices P, A, and B (the edge within the triangle opposite from the vertex C) is given by $$P=(A \times a+B \times b+C \times c)/(a+b+c).$$

Raster unit 54 also generates an attribute tag pipeline 84 and a barycentric coordinate pipeline 86, which are discussed in further detail herein below, and which are generated after generation of the barycentric coordinates. Raster unit 54 performs Hilbert curve rasterization.

A graphics pipeline may include attributes, a coverage mask, and barycentric coordinates. In the present invention, the graphics pipeline would include the attribute token pipeline 82, the barycentric pipeline 86, the attribute tag pipeline 84, and hardware elements comprising the raster unit 54, the texture unit 56, and the shader unit 58, explained in detail herein below.

Raster unit 54 receives the attribute token pipeline 82 from software executed on a host computer. The attribute token pipeline 82 transmits data originating from OpenGL calls executed on the host computer. The attribute token pipeline 82 is formed when the above-mentioned OpenGL calls are translated into the data by a driver available from Silicon Graphics, Inc. running on the host computer and are transmitted to the graphics chip 43.

Also as shown in FIG. 4, texture unit 56 includes level of detail calculation, texture addressing, control for the texture cache, the texture tree filter for lerps (linearly interpolate) and the TLUT (texture color lookup table). Texture unit 56 also includes an SRAM for an on-chip texture cache, and the texture cache SRAM is organized as 16 banks×512 words× 48 bits. Texture unit 56 is explained in further detail herein below.

Shader unit 58 shown in FIG. 3 includes shading and depth bi-lerps, per-pixel lighting, pre-lighting texture environments and post-lighting texture environments, fog, multi-fragment polygon antialiasing, and per-fragment tests and operations.

A display unit 60 is provided in each graphics subsystem 42, as shown in FIG. 4. The display backend 44 shown in FIG. 3 includes the display units 60 of the graphics subsystems 42, and additional functions. The display unit 60 shown in FIG. 4 includes all of the pixel processing which occurs between the framebuffer and the output of the graphics subsystem 42 to the DAC or display backend 44. The display backend 44 combines the output from multiple graphic subsystems 42 for output by the DAC 46, or divides the output from the graphics system 30 to up to 4 DACs 46.

The display unit 60, transfers pixels and overlay/WID data from the framebuffer interface into first-in, first-out queues (FIFOs), changes pixels from the framebuffer format into a standard format RGB component format, maps color indexed into final RGB pixel values and applies gamma correction to all pixel data, generates all timing control signals for the various parts of the display unit 60, and provides read and write access to registers and memories in the display unit 60.

The graphics chip 43 of the present invention also includes pins/pads 61 for physical access to the graphics chip 43, and JTAG unit 63 for chip testing purposes.

The present invention resides in Texture Unit 56. Texture Unit 56, along with Raster Unit 54 (including Scheduler 102) and Shader Unit 58), is described in detail in *A Method for Efficient Handling of Texture Cache Misses by Recirculation*. An overview of Texture Unit 56 is presented herein, and the present invention is described in detail with reference to FIGS. 5–12.

Attributes are transmitted throughout the graphic subsystem 42, which includes vertex data such as the s and t coordinates, RGBA information, per-vertex information, coverage, etc.

Texture unit 56 includes all of the logic required to create a texture fragment (or texel) for combination with a pixel fragment at the blend stage of the rendering pipeline implemented by the graphic subsystem 42. Textures are preloaded from DMA.

FIG. 5 is a block diagram of texture unit 56. The raster unit 54 transmits attribute information, including S, T, and R coordinates, to the texture unit 56. The S and T coordinates may be generated by sources such as steppers, plane equation evaluators, bilinear interpolators, or other sources, and may be delivered by a pipeline.

The texturing process implemented in the texture unit 56 begins with evaluation of texture coordinate quads (the S, T, and R, or s, t, and r, coordinates, in which the r coordinate is not used for the 2-dimensional texturing mode) corresponding to pixel coordinate quads (X, Y, and Z) in the texture bilerps 62. The texture bilerps 62 receive the attribute token pipeline 82, the barycentric coordinate pipeline 86, and the attribute tag pipeline 84 from the raster unit 54, and extract the s, t, and r coordinates therefrom. The texture bilerps 62 also receive the recirculation pipeline 88, which is a combination of the recirculated attributes, barycentric coordinates and coverage bits which occurs after a texture cache 74 miss, and determine which of the recirculated or newly-received data to transmit through the texture unit 56 and the shader unit 58, as explained in *A Method for Efficient Handling of Texture Cache Misses by Recirculation*.

In the texture unit 56, both of the attribute token pipeline 82 and the attribute tag pipeline 84 interface to texture bilerps 62, texture address reformatter 64, level of detail unit 66, texture address unit 68, tcache control 70, format unit 76, texture mux 78, texture filters 80, and texture LUTs 83. The barycentric pipeline 86 interfaces only to the texture bilerps 62.

The pixel quads arrive from the texture bilerps 62 as pixel pairs in time multiplexed fashion at the input to the texture address reformatter 64. The texture address reformatter performs a float to fixed conversion on the coordinates for basic 1-dimensional, 2-dimensional, and 3-dimensional texturing modes.

Next, and also as shown in FIG. 5, for most texturing modes, and, in particular, for 1-dimensional and 2-dimensional texturing, a level of detail calculation is performed in the level of detail unit 66 based upon the pixel quads presented to the level of detail unit 66 from the texture address reformatter 64. The level of detail calculation derives the size of the texel in pixel space, and is explained in *A Method for Improving Texture Locality for Pixel Quads by Diagonal Level-of-Detail Calculation*, id.

Once the level of detail is computed, the quad of pixels in pairs of S, T, and R (R, or r, is currently ignored for 2-dimensional texturing) coordinates that entered the level of detail unit 66, along with a level of detail (LOD) value, are output by the level of detail unit 66. Addressing calculations can then be made in the texture address unit 68 based on the glTexparameter settings associated with the current texture image. GlTexparameter settings are part of the OpenGL graphics system described in the *OpenGL Programming Guide, The Official Guide to Learning OpenGL, Release* 1.1, id.

The texture address unit 68 then outputs a set of quad texel addresses 72 which are applied to the texture cache 74 so that a corresponding and proper set of texel fragments are retrieved from the texture cache 74 for eventual filtering. In mipmapping operations, the set of addresses fetches a four texel neighborhood from each of the two maps that bound the calculated size of the bilerped (bilinear interpolate) quad. For non-mipmapped operations, only one map is available and therefore only the quad texel's footprint in that map is used in the filtering process.

The operation of the texture address unit 68 and the texture cache 74 in the present invention is explained in further detail herein below. The texture cache 74 is organized into 16 banks×512 words×48 bits of data. Texture cache 74 is a direct mapped, hashed cache.

In addition, the texture address unit 68 interfaces to the texture cache control unit 70, which provides fault information 131 to a scheduler 102 in the raster unit 54. Further, the format unit 76 receives a 256-bit bus 77 from SDRAM 50, and provides input 141 to the texture cache 74.

The textures originate from the SDRAM 50, and are loaded along the 256-bit bus 77 into the format unit 76, which expands or compresses the formats depending upon in what format the texture was stored. Then, a portion of that texture image is loaded into the texture cache 74. From the texture cache 74, the texels are loaded through the texture mux 78. Therefore, the texture mux 78 does not interface directly to the SDRAM 50 because data is first loaded into the texture cache 74 before being used elsewhere in the graphics pipeline of the present invention.

The texture mux 78 receives the output of the texture cache 74 and selects subregions of the texels read out of the texture cache 74. The output of the texture cache 74 is a 4×4 texels footprint, so 16 texels are output from the texture cache 74 at a time. The 16 texels are always adjacent (for example, 4 adjacent by 4 adjacent) to each other. The texture mux 78 selects 4 2×2 subregions of the 4×4 region. There are many different combinations of 2×2 subregions of texels within the 4×4 region of texels of the image; for example, the lower left corner 2×2 subregion, the lower right corner 2×2 subregion, etc. The texture mux 78 selects any 4 of those combinations depending upon where the 2×2 subregions are situated relative to the 4×4 footprint. The texture mux 78 outputs 16 RGBA values, 4 for each 2×2 subregion. Accordingly, there are 4 subregions, each containing 4 texels, and each texel having an RGBA value. The texture multiplexer 78 outputs texture fragments RGBA, which is the color (RGB) of the texel and the alpha of the texel.

The texture address unit 68 determines which 2×2 subregion that the texture mux 78 should select, based upon the tmux control signal 79 output by the texture address unit 68 to the texture mux 78. To determine which 2×2 subregion to select, the texture address unit 68 examines a quad of pixels flowing through the texture unit 56 through attribute token pipeline 82, and determines which 2×2 regions of the overall texture image must be pulled out to provide the required texels for each of the pixels. There is one 2×2 subregion required for each pixel in the quad of pixels, so 4 of the 2×2 subregions are selected by the texture address unit 68. Once the texture address unit 68 determines where the 4 of the 2×2 regions selected reside in the overall picture image, the texture address unit 68 determines how many of the 2×2 subregions fit into one of the types of footprints that can be read from the texture cache 74, such as the 4×4 footprint.

In many cases, all 4 of the 2×2 subregions fit within the 4×4 footprint. For the pixels having corresponding texels within the 4×4 footprint, the corresponding texels are read from the texture cache 74. However, if all 4 of the 2×2 subregions do not fit within the 4×4 footprint, then additional texels not within the 4×4 footprint must be retrieved from the texture cache during a subsequent recirculation.

Figure 7:
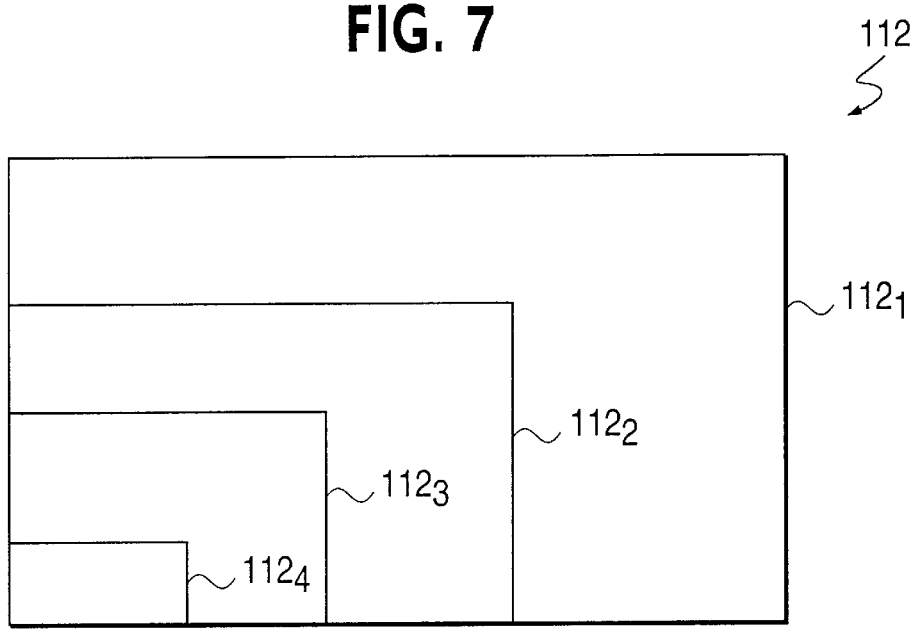
FIG. 7 is a diagram showing relationships between mipmapped images.

If texels are not within the texture cache, they must be retrieved from the SDRAM 50, and the texture address unit 68/texture cache 74 indicates the texture cache fault to the tcache control unit 70 through bus 131, and a texture cache fault 131 is generated. The texture cache fault 131 is transmitted to scheduler 102, as shown in FIG. 7. Scheduler 102 then opens a slot (which is an empty space) in the graphics pipeline (including the attribute token pipeline 82, the barycentric pipeline 86, and the attribute tag pipeline 84), and carries out recirculation as explained in *A Method for Efficient Handling of Texture Cache Misses by Recirculation.* Concurrently therewith, the requested texels are read from the texture memory in the SDRAM 50 into the texture cache 74.

For the texels for which a texture cache fault has been submitted, the texels are read from SDRAM 50 along bus 77 through format unit 76 and along bus 141 into the texture cache 74 during the same time period in which recirculation of the quad of pixels occurs, thus preventing a stall in the graphics pipeline. Accordingly, in parallel with the recirculation of the above-mentioned data during a texture cache miss, the texture cache 74 retrieves from the texture memory the requested data, and stores the requested texel in the texture cache 74.

In the final stages of the texturing process, various filtering functions are performed on the texels to calculate the ultimate contribution the texels make to the fragment color. The first filter operation is the actual weighted averaging of the mipmap neighborhoods to produce the interpolated texel fragment, in texture filters 80 and texture LUTs (look up tables) 83.

The output of the texture LUTs 83 is presented to shader unit 58. In addition, pipelines 82, 84, and 86 feed into shader unit 58, and recirculation bus 88, which recirculates texture addresses for a texture cache miss and which is explained in detail in *A Method for Efficient Handling of Texture Cache Misses by Recirculation*, id., is received from shader unit 58 into the texture bilerps 62.

The texture unit 56 provides 1-dimensional, 2-dimensional, and 3-dimensional (orthographic) texture mapping with high performance.

Also included in the texture mapping process, but accomplished in the shader unit 58, is advanced pixel shading techniques applied in the next two stages (per pixel lighting and lighting environment), and, as a final operation optionally performed on the texel fragments, the application of fog.

The texture unit 56 has additional data paths and configurations not shown in FIG. 5 that allow the texture unit 56 to implement other advanced imaging operations such as convolutions and fast fourier transforms (FFTs) and asundry texture variants such as Pixel Texturing. Additional explanation is provided in *A Method and Apparatus for Providing Image and Graphics Processing Using A Graphics Rendering Engine.*

The particular features of the present invention reside in texturing, and, in particular, in texture address unit 68 and texture cache 74 of FIG. 5, and are now described in detail with reference to FIGS. 5–12.

Texturing maps a portion of a specified image onto each primitive for which texturing is enabled. Texture mapping is accomplished by using the color of an image at the location indicated by a fragment's s, t, and (for 3-D texturing) r coordinates to modify the fragment's RGBA color. In The embodiment of present invention applies to 2-dimensional texturing, but could be extended to 3 or more dimensional texturing. Texturing is specified only for RGBA mode, and its use in color index mode is undefined.

Texture address 72 shown in FIG. 5 is determined by texture address unit 68 based on sets of S, T, and R (s, t, and r) coordinates passed through the level of detail unit 66 and a level of detail (LOD) input determined by the level of detail unit 66 (but without contribution from the tcache control unit 70 or the pipelines 82 and 83) as shown in FIG. 5. As above, the R (or r) coordinate is not used in the present invention, even though shown in FIG. 5 and referred to herein. The texture address 72 is then presented to texture cache 74 shown in FIG. 5.

Also as shown in FIG. 5, level of detail unit 66 is coupled to the attribute pipe 82 and the coverage pipe 84, but receives as input the sets of S, T, R coordinates from the texture address reformatter 64. The S, T, and R coordinates are passed through the level of detail unit 66 without the level of detail unit 66 further manipulating the S, T, and R coordinates. Level of detail calculations are explained briefly herein below, and in detail in *A Method for Improving Texture Locality for Pixel Quads by Diagonal Level-of-Detail Calculation.*

S, T, and R coordinates correspond to each pixel, and, accordingly, there are four sets of S, T, and R coordinates for a quad of pixels. However, for each quad of pixels, there is one level of detail (LOD) value associated therewith.

As explained herein above, the level of detail determines which array in an ordered set of arrays representing the same image in a mipmap is selected for rendering, with each array having a lower resolution than the previous array.

The internal formats of all of the mipmap arrays must be previously specified at the time that a primitive is rasterized, and if the internal formats are incomplete, then texture mapping is treated as if disabled. The mipmap is used in conjunction with the level of detail to approximate the application of an appropriately filtered texture to a fragment.

Figure 6A:
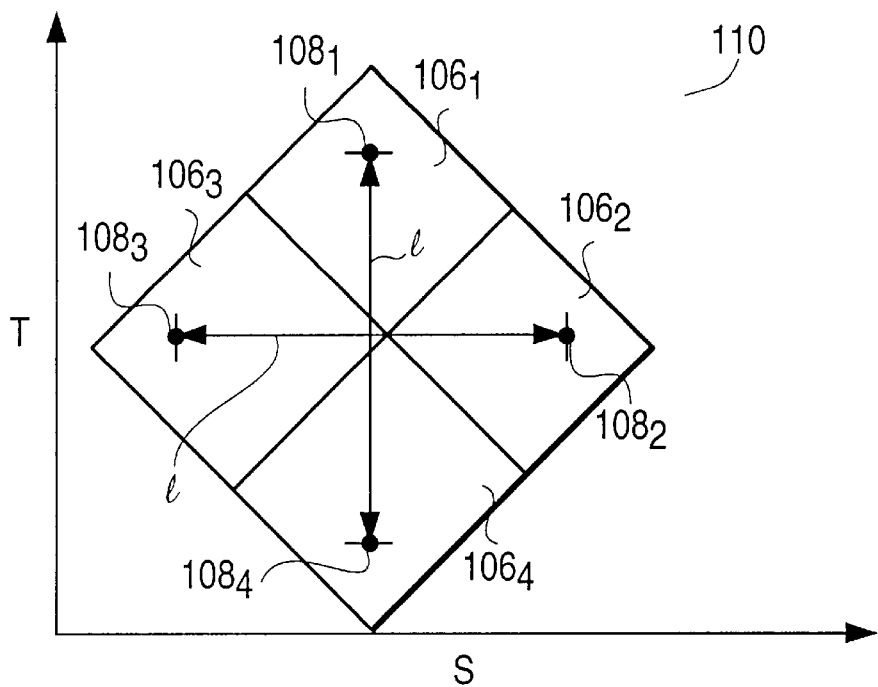
FIGS. 6(A), 6(B), and 6(C) are diagrams showing relationships between texels and pixels.
Figure 6B:
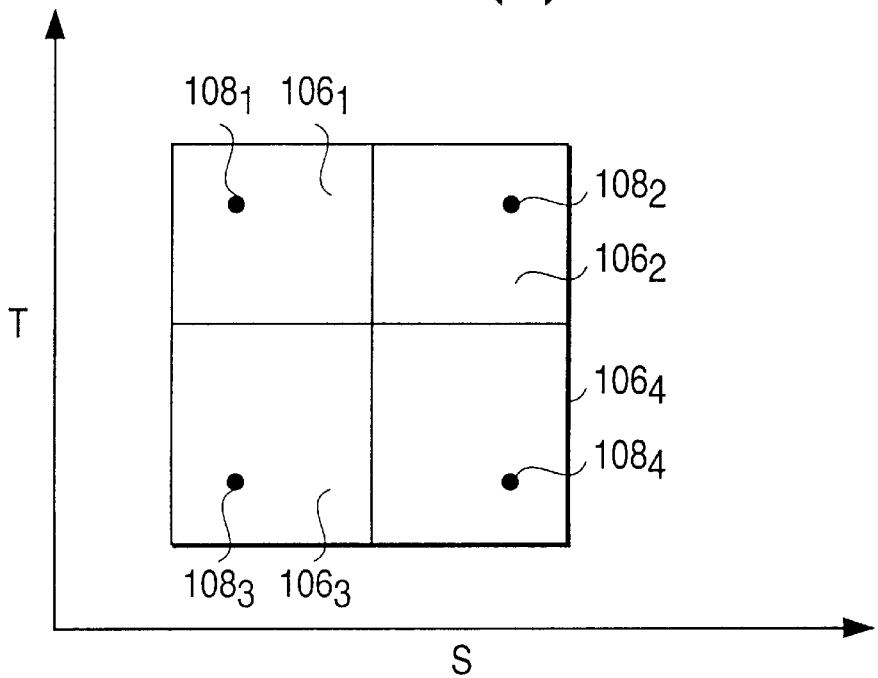
Figure 6C:
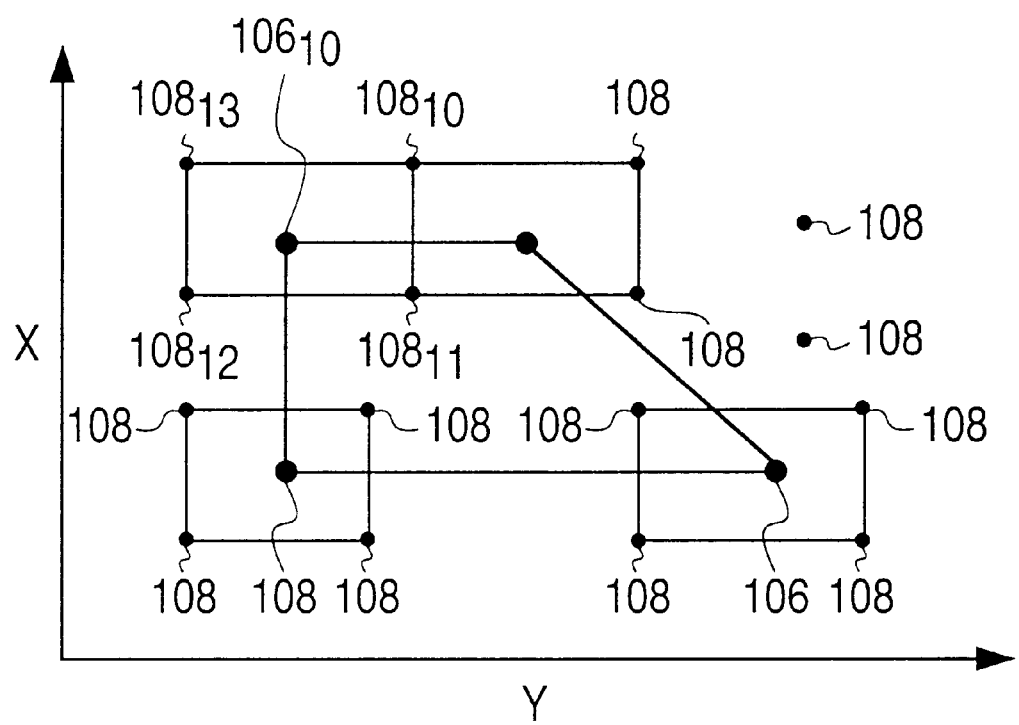

FIGS. 6(A), 6(B), and FIG. 6(C) show views of relationships between texels and pixels. FIGS. 6(A) and 6(B) show a projection of 4 pixels $106_1$ through $106_4$ into a texture map 110 in S and T coordinates. As shown in FIGS. 6(A) and (B), each texel $108_1$ through $108_4$ corresponds to one of the quad of pixels 106, and there is a maximum distance 1 between each of the texels $108_1$ through $108_4$ of 2 texels.

The projection of the quad of pixels $106_1$ through $106_4$ into the texture memory as shown in FIGS. 6(A) and (B) is the footprint of the pixels in texture memory. The GL best or sharpest limit occurs if the texels are mapped at 90 degrees with respect to the pixels (shown in FIG. 6(B)), whereas the GL worst or blurriest limit is if the texels are mapped at 45 degrees with respect to the pixels (which is shown in FIG. 6(A)). FIG. 6(C) shows a projection of 4 texels $108_1$ through $108_{13}$ surrounding a pixel $106_{10}$, in X and Y coordinates.

Mipmapping applies texture to shape. FIG. 7 shows examples of mipmap layers $112_1$ through $112_4$ corresponding to an image. The mipmap layer for display is selected using texture addressing by the s and t coordinates and the level of detail is determined as explained below. If mipmap layers (corresponding to level of detail) 1 ($112_4$) and 2 ($112_3$) exist, but the level of detail designates that a mipmap layer corresponding to 1.3 is to be displayed, then the mipmap layer is interpolated between layers 1 and 2, so as to prevent aliasing by virtue of the level of detail calculation, in which layer 2 is never aliased, but is blurry, but layer 1 is aliased. A bilinear interpolation (bilerp) level of detail is determined by, consistent with the above-mentioned example, taking 0.3 of the level 2 mipmap and 1–0.3 of the level 1 mipmap.

The level of detail determines which of the above-mentioned mipmaps in the pyramid of mipmaps to select, and the level of detail calculation explained in *A Method for Improving Texture Locality for Pixel Quads by Diagonal Level-of-Detail Calculation* guarantees that all texels are within a 4×4 footprint for the 1-dimensional and the 2-dimensional cases.

Figure 8:
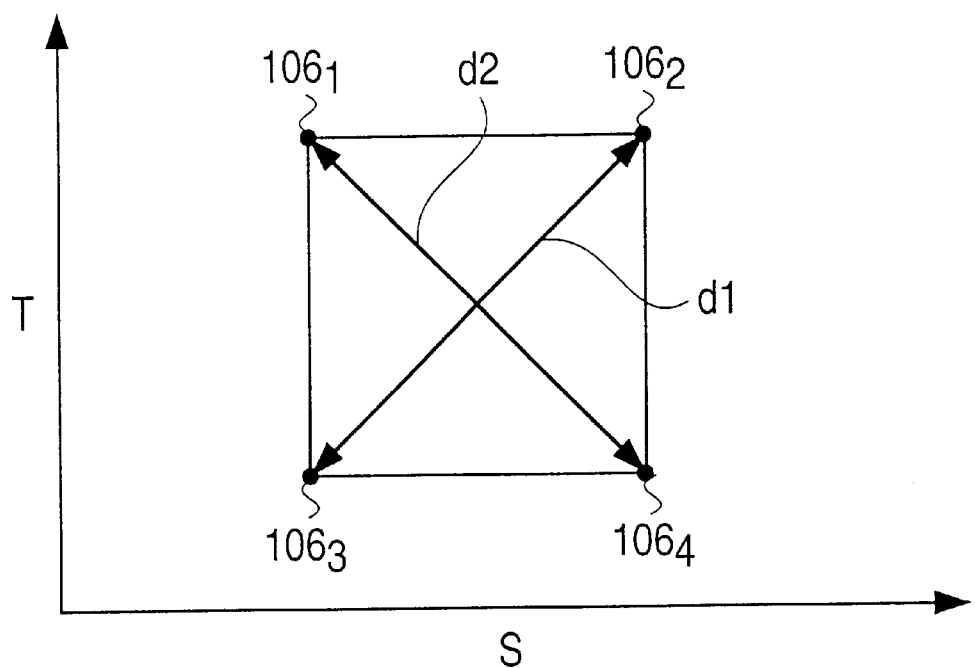
FIG. 8 is a diagram showing calculation of a diagonal level of detail.

A brief overview of the level of detail (LOD) determination disclosed in *A Method for Improving Texture Locality for Pixel Quads by Diagonal Level-of-Detail Calculation* is now presented with reference to FIG. 8. Four pixels 106$_1$ through 106$_4$ are shown in FIG. 8. The diagonal distance d2 with respect to the quad of pixels and between pixels 106$_1$ and 106$_4$ is defined as x−Y. Likewise, the diagonal distance d1 with respect to the quad of pixels and between pixels 106$_2$ and 106$_3$ is defined as X+Y. The level of detail (LOD) calculated is:

$$LOD = \log_2(\max(|dS/dd1|, |dS/dd2|, |dT/dd1|, |dT/dd2|))$$

where (max(|dS/dd1|, |dS/dd2|, |dT/dd1|, |dT/dd2|) ranges between 0 (the clearest representation) and ∞ (the coarsest representation). The level of detail is determined by determining the log$_2$ of the maximum distribution in s and t coordinates along the diagonals d1 and d2 by determining the maximum absolute differential of the s and t values along the diagonals d1 and d2. In determining the LOD, there is a distance of no more than 2 texels between texels corresponding to the pixels shown in FIG. 8 and which cover a 4×4 region or a torroidal wrap thereof. Accordingly, the two least significant bits of each texel address directly select the 16 banks of texel memory described herein above.

When an image is displayed, the texture cache is accessed to provide textures associated with that image. Accordingly, when a user steps through minified areas of a displayed image, multiple texture cache accesses are required, and, in the related art, adjacent texels are accessed. However, in many circumstances, the user may want to step through the minified areas of the displayed image quickly, but would be limited by the amount of texture cache accesses required in accessing adjacent texels in the related art. Therefore, the present invention increases the speed at which the user may step through minified areas of a displayed image by executing an accelerated minification technique, as explained with reference to FIGS. 9–11.

Figure 9:
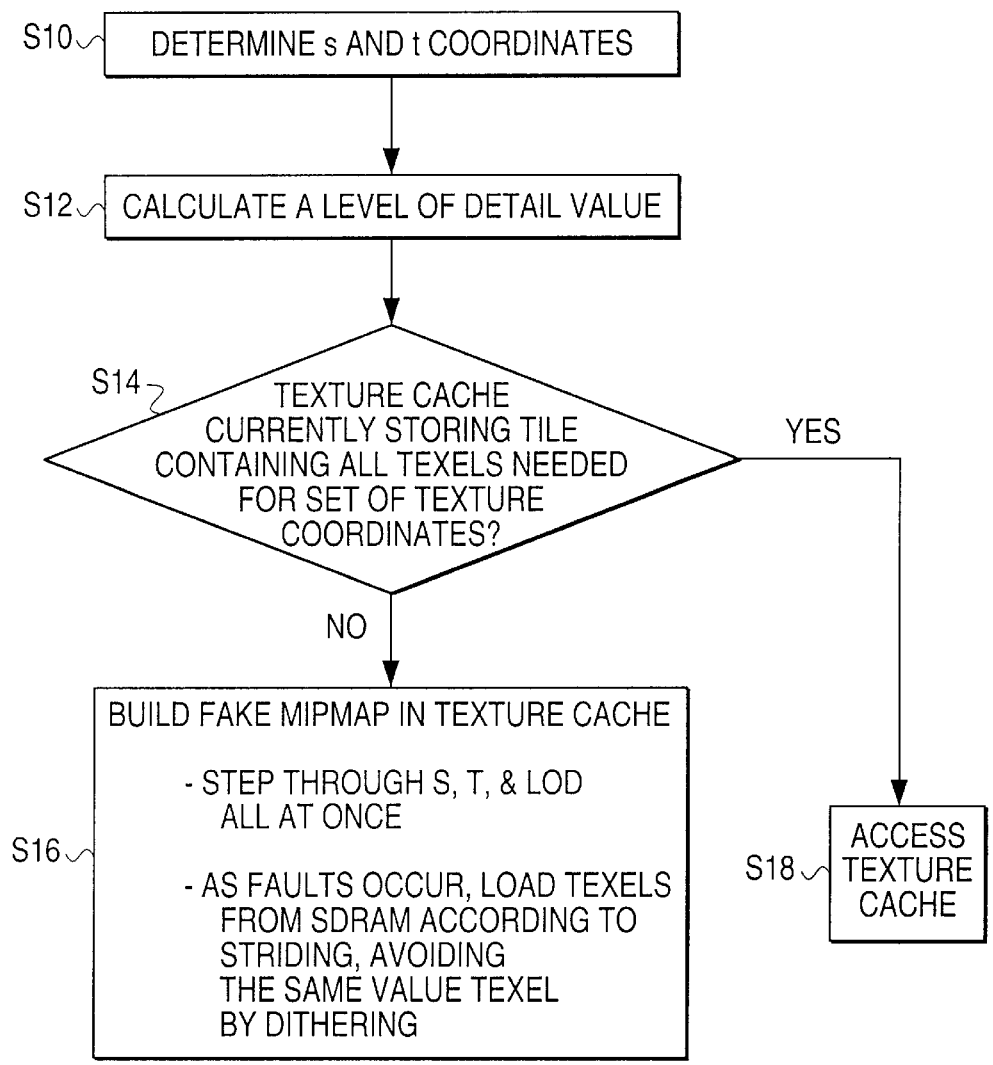
FIG. 9 is a flowchart of performing an accelerated minification technique of the present invention.

The method of the present invention for executing an accelerated minification technique, which accelerates minified texture cache access, is summarized by the flowchart shown in FIG. 9. As shown in FIG. 9, in step S10, s and t coordinates are first determined. Then, in step S12, a level of detail (LOD) value is calculated. The level of detail is calculated as if a real mipmap were involved.

Step S14 determines whether the texture cache is currently storing all of the texels needed for the set of texture coordinates. If not, the fake mipmap is constructed in the texture cache in step S16. A fake mipmap, or pyramid, of images is constructed, as though a real mipmap pyramid were being determined, with mipmapping turned off. In the graphics subsystem implementing the present invention, a tile is 16×16 texels. If the stride value is 16, then a "tile" is constructed in the texture cache which is 16 individual pixels by 16 individual pixels, with gaps of the stride value in between. Building of the fake mipmap is discussed in detail with reference to FIGS. 10 and 11.

Then, and also in step S16, texels are stepped through, based on the s and t coordinates of the texels, and the level of detail (LOD). As faults occur, in step S14, texels are loaded into texture cache 74 from SDRAM 50 (which stores the original image) according to a stride value (which is referred to as striding or decimating), instead of loading adjacent pixels into texture cache 74 from SDRAM 50. In striding, all but the nth texels are discarded, in which n=2$^{LOD}$. To ensure that there is no unnatural correlation between the fake mipmap levels of detail, dithering is applied to offsets of the levels of detail. In the present invention, therefore, textures are displayed by striding through the texture cache.

If the texture cache contains the required data, then texture cache access proceeds in step S18.

Figure 10:
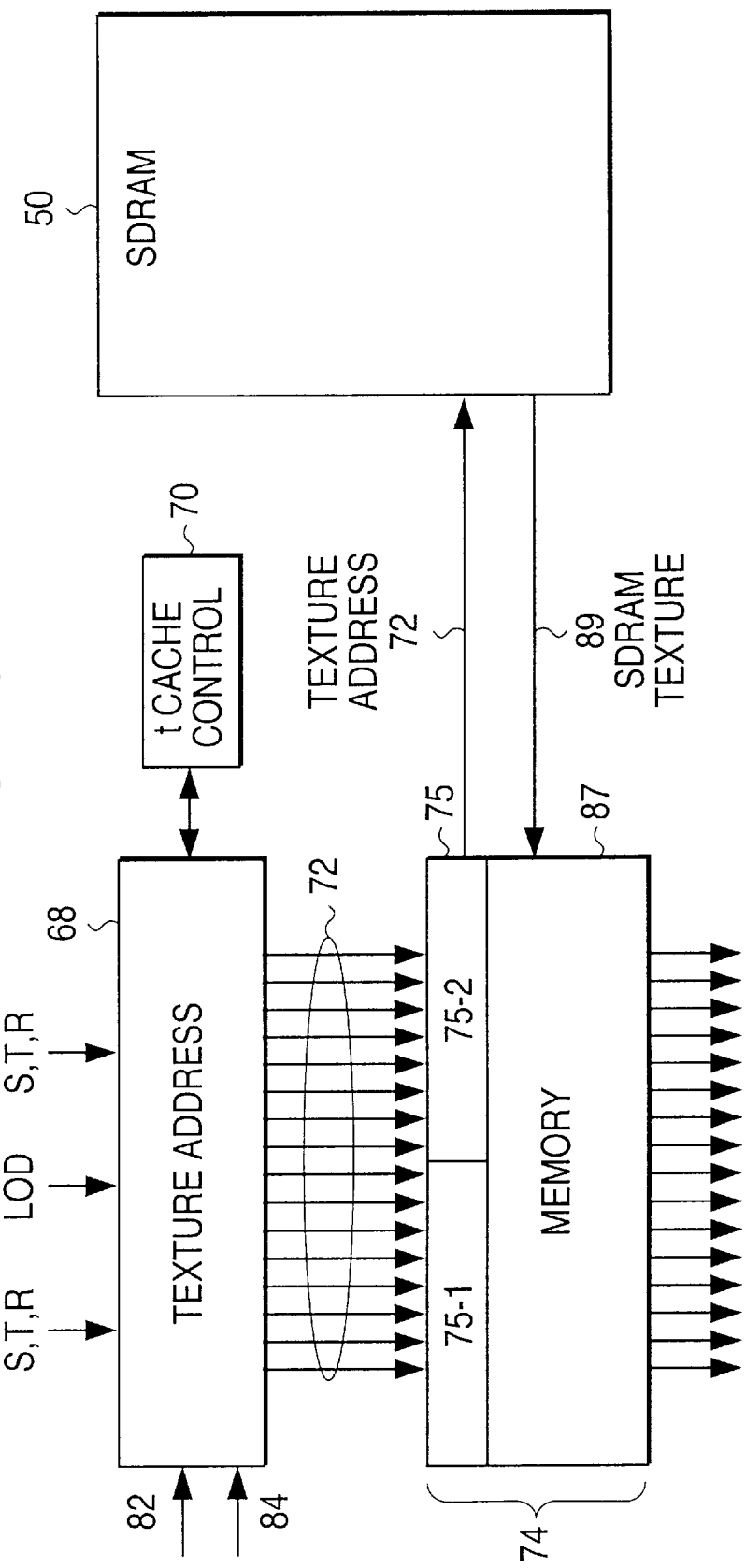
FIG. 10 is a block diagram showing mapping of texel numbers from texture address unit to an SDRAM address using the striding number, in the present invention.

FIG. 10 is a detailed diagram of a relationship between texture address unit 68, texture cache control unit 70, texture address 72, and texture cache 74 of texture unit 56 of graphics subsystem 42 of the present invention, and SDRAM 50 of graphics subsystem 42 of the present invention. Minified texture cache access (or the accelerated minification technique) according to the present invention is implemented in texture address unit 68, texture address 72, texture cache 74 and SDRAM 50. As shown in FIG. 10, s, t, and r coordinates and a value of the level of detail (LOD) are input from the level of detail unit 6 of texture unit 56 to texture address unit 68. Then, the texture address 72, which is based upon s, t, and r coordinates, and the LOD value, as described herein above, is input to texture cache 74.

Also as shown in FIG. 10, texture cache 74 comprises table 75 and memory 87. Memory 87 stores the data associated with the texture cache 74, which is texel values. Table 75 stores a mapping relationship between the texel numbers indicated by the texel address 72 to the SDRAM addresses and a striding number according to the present invention. The striding number (or stride value) in the present invention is 2$^{LOD}$. For conventional bilinear interpolation, the stride value would be 1.

If the texel value to be displayed, based upon texture address 72 and as indicated in table 75, is stored in the texture cache 72, the texel value is retrieved and provided to texture mux 78. However, if the texel value to be displayed, based upon texture address 72 and as indicated in table 75, is not stored in the texture cache 72, then a texture cache miss occurs and texture address 72 is provided to SDRAM 50. The texel value to be displayed is retrieved from SDRAM 50 as SDRAM texture 89, based upon the texture address 72 provided to SDRAM 50, stored in texture cache 74, and provided to texture mux 78.

Conventionally, adjacent texel values are retrieved form SDRAM 50, which occurs by retrieving the entire tile with which the requested texel value is associated. However, in the accelerated minification technique of the present invention, the texel value which is a distance of 2$^{LOD}$ away in both the s and t directions from the previous texel is retrieved from SDRAM 50 and stored in texture cache 74. Adjacent texel values are not necessarily retrieved from SDRAM 50 in the present invention, unless a non-minified image is selected for display (in which case, LOD=0, the stride value of 2$^{LOD}$=1, and the adjacent texel is selected).

If a texture cache 74 miss occurs, as explained herein above, the texel value is retrieved from SDRAM 50. When mipmapping is enabled, there is a table entry in table 75 for each mipmap level. Each mipmap level has a different address, and the stride value for each mipmap level is equal to 1.

In an accelerated minification technique of the present invention, the starting address for each of the fake mipmap entries is the same (as indicated in table 75), but each fake mipmap entry has a different level of detail associated therewith, and, accordingly, a different stride value since the stride value=2$^{LOD}$. Therefore, in the accelerated minification technique of the present invention, all addresses point to the same texture, there is no mipmap pyramid stored in the SDRAM 50, and there is only one image stored in the SDRAM 50. Accordingly, table 75 stores the starting address of the texture, along with the stride value, which, in the accelerated minification technique of the present invention, is 2$^{LOD}$.

For example, in the accelerated minification technique of the present invention, if there are 8 levels of detail stored in the texture cache 74, all have the same starting address for the SDRAM 50, but each of the 8 levels of detail has a different stride value than the others of the 8 levels of detail. Accordingly, a decimated region is fetched from the SDRAM 50 and stored in the texture cache 74, in the accelerated minification technique of the present invention. In the present invention, SDRAM is sampled every nth texel, without taking tiling into account. Tiles, though, are constructed in the texture cache, taking striding into account.

FIG. 10 also shows an example of the organization of table 75, in which the texture address is stored in field 75-1 and the associated stride value for the fake mipmap is stored in field 75-2.

Figure 11:
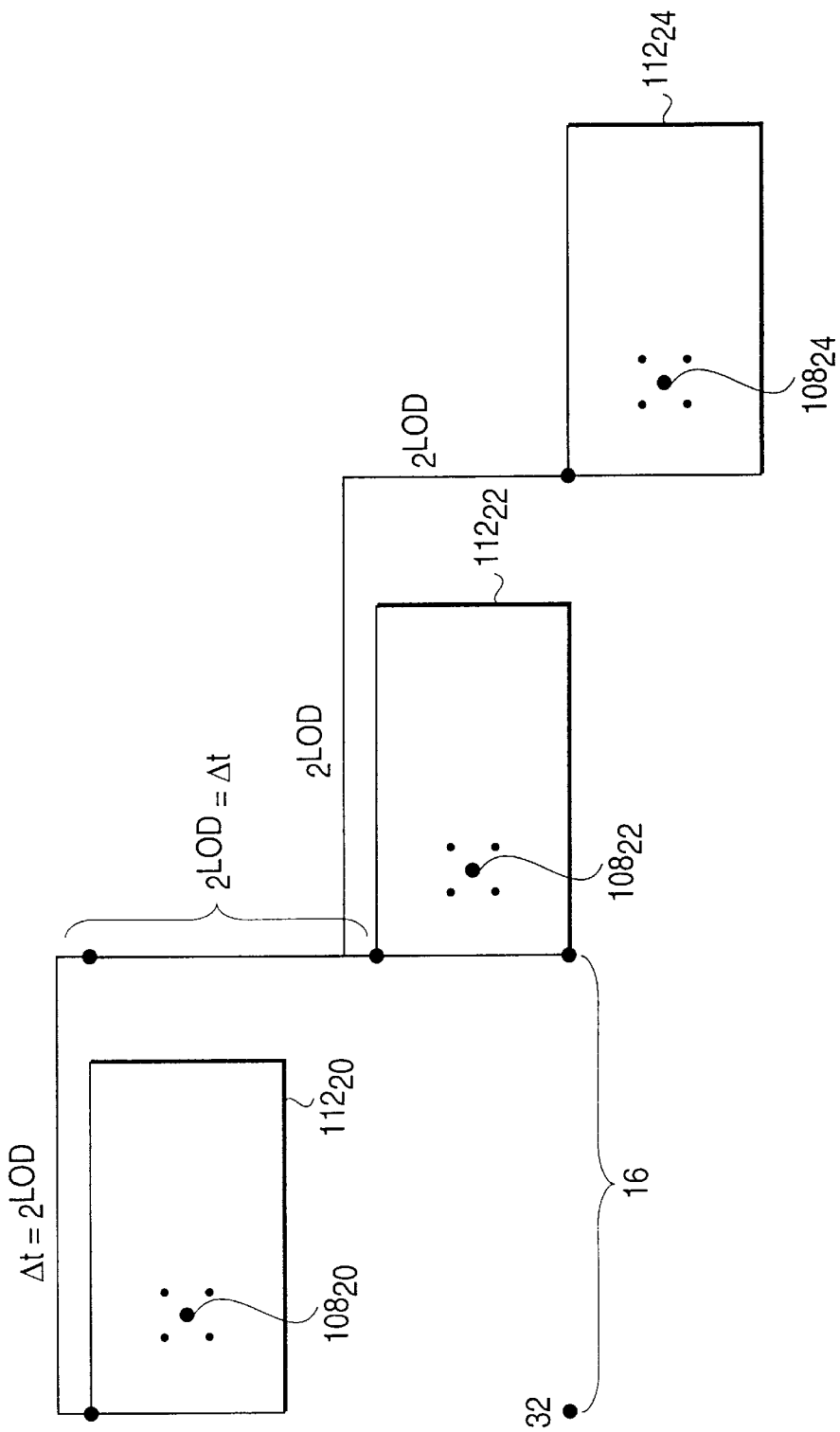
FIG. 11 is a diagram of a relationship between tiles comprising texels based upon the stride value, in the present invention.

FIG. 11 is a diagram showing texels organized into tiles in SDRAM 50 and retrieved from SDRAM 50 according to the accelerated minification technique of the present invention. As shown in FIG. 11, each tile 112 comprises texels 108, with 16 texels on a side.

If texel $108_{20}$ is addressed by the s and t coordinates, then tile $112_{20}$ is read from SDRAM 50 into texture cache 74. Then, the next tile $112_{22}$ read from SDRAM 50 into texture cache 74 is in an adjacent plane orthogonal to the s and t coordinates indexed by the level of detail. Likewise, tile $112_{24}$ is in another adjacent plane orthogonal to the s and t coordinates one level of detail unit away from the previous tile $112_{22}$. In the preferred embodiment of the present invention, there are 32 tiles of 16 pixels on a side (16×16) stored in the texture cache. The data upon which the above-mentioned operations are being performed is assumed to be stored in the texture cache 74, and, if not stored therein, is read in from the SDRAM 50.

For example, and as shown in FIG. 11, if the level of detail is 4, and the starting address of tile $112_{20}$ is at s=32, then the starting address of tile $112_{22}$ would be $s=32+2^4=48$.

In addition, to break up an obvious pattern so that the accelerated minification technique is not apparent, ensure that the next level of detail selected does not land on the same texel. To accomplish the foregoing, dithering is enabled. In dithering in the present invention, the fractional part of the original level of detail calculation is hashed (or bit reversed), then that new fractional value is added back to the level of detail. However, dithering can be accomplished in many ways, including the above-mentioned bit-reversing. An offset for a texel value into a tile 112 would be, for example, s=s-LOD, t=t-LOD, to ensure that from one level of detail to the next, the same texels are not selected to provide randomization and the impression of being aliased. Other examples of offsets include, but are not limited to, s=s+LOD, t=t+LOD; s=s+LOD, t=t-LOD; s=s-LOD, t=t+LOD; s=s+bit reverse of LOD, t=t+bit reverse of LOD; injection of noise; etc.

The fake mipmap pyramid is built in the texture cache 74 in realtime by retrieving from SDRAM 50 every $2^{LOD}$ texel, which is referred to as striding or decimating through the SDRAM 50. In the present invention, the SDRAM 50 is being skipped through coarsely, and every $2^n$ texel is retrieved therefrom and input into the texture cache 78, then filtered down, providing the neighborhood of the image in the texture cache 78 used to interpolate for the filtering. From the image in the SDRAM 50, every $2^{LOD}$ texel is read in both the s and the t directions, and store that into the texture cache 78, forming a tile at a time. At a minimum, the s and t values, and the nearest 4 neighbors, of a texel for every $2^{LOD}$ texel is read from the SDRAM 50 of the present invention into the texture cache 74. Once the fake mipmap is built in the texture cache 74, mipmapping, and, in particular, retrieval of texel values during mipmapping, proceeds conventionally during texture cache 74 faults. If a texture cache 74 miss occurs, the texels are retrieved as explained herein above from SDRAM 50. mipmap arrays can be either 1-dimensional or 2-dimensional, and the above-mentioned accelerated minification technique of the present invention is described for the 2-dimensional case, which derives a greater benefit from the accelerated minification technique of the present invention than does the 1-dimensional case.

Since texture cache 74 is a direct mapped, hashed cache, the least significant bits of the texture address are used to access the fake mipmap pyramid.

The efficiency of the texture cache 74 access in the present invention is as if the image were mipmapped and accessed using bilinear interpolation, without thrashing through the texture cache 74.

An example of code fragments from a C language simulator on which a prototype of the accelerated minification access of the present invention is made is:

Accelerated Minification Access (modification to rho):

```
/* if active (not mipmap), do anisotropic minification access */
if (glMinificationAccess && ((gc->procs.texture == _glFastTextureFragment) || (gc->procs.texture == _glTextureFragment)) &&
    (rho > 1.0)) {
    /* generate minimum anisotropic rho for minification access */
    if (tex->dim > 2) {
        rho = min(min(max(max((abs(ss[0][0]-ss[0][1])  * tex->level[0].width2f),
                 (abs(tt[0][0]-tt[0][1])  * tex->level[0].height2f)),
                 (abs(rr[0][0]-rr[0][1])  * tex->level[0].depth2f)),
             max(max((abs(ss[1][0]-ss[1][1])  * tex->level[0].width2f),
                 (abs(tt[1][0]-tt[1][1])  * tex->level[0].height2f)))),
             min(max(max((abs(ss[0][0]-ss[1][0])  * tex->level[0].width2f),
                 (abs(tt[0][0]-tt[1][0])  * tex->level[0].height2f)),
             max(max((abs(ss[0][1]-ss[1][1])  * tex->level[0].width2f)g,
                 (abs(tt[0][1]-tt[1][1])  * tex->level[0].height2f)))));
    } else {
        rho = min(min(max((abs(ss[0][0]-ss[0][1])  * tex->level[0].width2f),
                 (abs(tt[0][0]-tt[0][1])  * tex->level[0].height2f)),
             max((abs(ss[1][0]-ss[1][1])  * tex->level[0].width2f),
                 (abs(tt[1][0]-tt[1][1])  * tex->level[0].height2f))),
             min(max((abs(ss[0][0]-ss[1][0])  * tex->level[0].width2f),
                 (abs(tt[0][0]-tt[1][0])  * tex->level[0].height2f)),
             max((abs(ss[0][1]-ss[1][1])  * tex->level[0].width2f),
                 (abs(tt[0][1]-tt[1][1])  * tex->level[0].height2f))));
    }
```

```
                /* clamp to min/mag crossover */
                if (rho < 1.0) {
                    rho = 1.0;
                }
            }
        }
    }
Minification Access (application of texture filter):
/*
** Linear min/mag filter
*/
void _glLinearFilter(_GLtexture *tex, _GLfloat lod, _GLfloat s, _GLfloat t, _GLfloat r, _GLtexel *result)
{
/* if minification access, create on fly decimated lods
    and use nearest_mipmap_linear with dither */
    if ((glMinificationAccess) && (lod > 0.0)) {
        _GLcontext *gc = tex->gc;
        _GLtexel td0, td1;
        _GLfloat f, omf;
        int si, ti, l0, l1, li, pm4;
        _GLfloat s0, t0;
        _GLfloat s1, t1;
        /* get hash function of lod frac */
        li = lod * 4096.0;
        lod -= (((li & 0x001) << 5) +
                ((li & 0x004) << 2) +
                ((li & 0x010) >> 1) +
                ((li & 0x040) >> 4) +
                ((li & 0x100) >> 7) +
                ((li & 0x400) >> 11)) / 64.0;
        if (lod < 0.0) lod = 0.0;
        /* dither lod with hash of lod frac */
        /* don't let fake mipmap get smaller than a tile */
        pm4 = tex->p - 4;
        if(pm4 < 0) {
            pm4 = 0;
        }
        if (lod > pm4) {
            l0 = pm4;
        } else {
            l0 = lod;
        }
        if (lod+1 > pm4) {
            l1 = pm4;
        } else {
            l1 = lod+1;
        }
        if (l0 >= 1) {
            /* scale to texel address */
            si = s * tex->level[0].width2f;
            ti = t * tex->level[0].height2f;
            /* lop off lod's worth of lsbs */
            si >>= l0;
            ti >>= l0;
            /* shift up one */
            si <<= 1;
            ti <<= 1;
            /* "round" to one half */
            si += 1;
            ti += 1;
            /* shift back to original texel address */
            si <<= l0-1;
            ti <<= l0-1;
            /* offset each lod from neighbor, so uncorrelated */
            si -= l0-1;
            ti -= l0-1;
            /* scale back to s,t */
            s0 = (_GLfloat)si / tex->level[0].width2f;
            t0 = (_GLfloat)ti / tex->level[0].height2f;
            (*tex->nearest)(tex, &tex->level[0], s0, t0, &td0);
        } else {
            (*tex->linear)(tex, &tex->level[0], s, t, &td0);
        }
        if (l1 >= 1) {
            /* scale to texel address */
            si = s * tex->level[0].width2f;
            ti = t * tex->level[0].height2f;
            /* lop off lod's worth of lsbs */
            si >>= l1;
            ti >>= l1;
```

```
        /* shift up one */
        si <<= 1;
        ti <<= 1;
        /* "round" to one half */
        si += 1;
        ti += 1;
        /* shift back to original texel address */
        si <<= l1-1;
        ti <<= l1-1;
        /* offset each lod from neighbor, so uncorrelated */
        si -= l1-1;
        ti -= l1-1;
        /* scale back to s,t */
        s1 = (__GLfloat)si / tex->level[0].width2f;
        t1 = (__GLfloat)ti / tex->level[0].height2f;
        (*tex->nearest)(tex, &tex->level[0], s1, t1, &td1):
      } else {
        (*tex->linear)(tex, &tex->level[0], s, t, &td1);
      }
      f = __GL__FRAC(lod);
      omf = __glOne - f;
      result->alpha = 1.0;
      switch (tex->level[0].baseFormat) {
      case GL__LUMINANCE__ALPHA:
        result->alpha = omf * td1.alpha + f * td0.alpha;
        /* FALLTHROUGH */
      case GL__LUMINANCE:
        result->luminance = omf * td1.luminance + f * td0.luminance;
        result->r = result->luminance;
        result->g = result->luminance;
        result->b = result->luminance;
        break;
      case GL__RGBA:
        result->alpha = omf * td1.alpha + f * td0.alpha;
        /* FALLTHROUGH */
      case GL__RGB:
        result->r = omf * td1.r + f * td0.r;
        result->g = omf * td1.g + f * td0.g;
        result->b = omf * td1.b + f * td0.b;
        break;
      case GL__ALPHA:
        result->alpha = omf * td1.alpha + f * td0.alpha;
        break;
      case GL__INTENSITY_EXT:
        result->intensity = omf * td1.intensity + f * td0.intensity;
        result->r = result->luminance;
        result->g = result->luminance;
        result->b = result->luminance;
        result->alpha = result->luminance;
        break;
      }
    } else {
      (*tex >linear)(tex, &tex->level[0], s, t, result);
    }
  }
}
/*
**Nearest min/mag filter
*/
void __glNearestFilter(__GLtexture *tex, __GLfloat lod, __GLfloat s, __GLfloat t, __GLfloat r, __GLtexel *result)
{
  /* if minification access, create on fly decimated lods
     and use nearest__mipmap__nearest with dither */
  if ((glMinificationAccess) && (lod > 0.0)) {
    int li, pm4;
    /* get hash function of lod frac */
    li = lod * 4096.0;
    li = lod + 1.0 - (((((li & 0x001) << 5) +
                        ((li & 0x004) << 2) +
                        ((li & 0x010) >> 1) +
                        ((li & 0x040) >> 4) +
                       ((li & 0x100) >> 7) +
                       ((li & 0x400) >> 11)) / 64.0);
    /* dither lod with hash of lod frac */
    if (li >= 1) {
      int si, ti;
      /* don't let fake mipmap get smaller than a tile */
      pm4 = tex->p - 4;
      if(pm4 < 0) {
        pm4 = 0;
```

```
            }
            if (li > pm4) {
               li = pm4;
            }
            /* scale to texel address */
            si = s * tex->level[0].width2f;
            ti = t * tex->level[0].height2f;
            /* lop off lod's worth of lsbs */
            si >>= li;
            ti >>= li;
            /* shift up one */
            si <<= 1;
            ti <<= 1;
            /* "round" to one half */
            si += 1;
            ti += 1;
            /* shift back to original texel address */
            si <<= li-1;
            ti <<= li-1;
            /* offset each lod from neighbor, so uncorrelated */
            si -= li-1;
            ti -= li-1;
            /* scale back to s,t */
              /**** No need to FIXED-POINT because width2f, etc., are
                        all powers of 2 ****/
            s = (_GLfloat)si / tex->level[0].width2f;
            t = (_GLfloat)ti / tex->level[0].height2f;
            (*tex->nearest)(tex, &tex->level[0], s, t, result);
         } else {
            (*tex->nearest)(tex, &tex->level[0], s, t, result);
         }
      } else {
         (*tex->nearest)(tex, &tex->level[0], s, t, result);
      }
      /* for test vector generation */
      dv_texel[0] = dv_texel[4];
      dv_texel[1] = dv_texel[5];
      dv_texel[2] = dv_texel[6];
      dv_texel[3] = dv_texel[7];
      dv_sfrac0 = dv_sfrac1;
      dv_tfrac0 = dv_tfrac1;
      dv_lfrac = 0.0;
}
/*
** Apply detail magnification rules to find the texel value.
*/
void _glLDSFilter(_GLtexture *tex, _GLfloat lod, _GLfloat s, _GLfloat t, GLfloat r, _GLtexel *result)
{
   _GLcontext *gc = tex->gc;
   /* detail textures work only for GL_TEXTURE_2D */
   _GLdetailTextureSGIS *det = &(((_GLtextureExtension *) (tex->other))->detail);
   _GLtexture *dtex = _glLookUpTexture(gc, GL_DETAIL_TEXTURE_2D_SGIS);
   _GLtexel td, td1;
   _GLfloat f, nlod;
   /* get texture value from detail texture */
   /* if minification access, create on fly decimated lods
      and use nearest_mipmap_linear */
   assert(lod <= 0.0);
   nlod = lod - det->level;
   if ((glMinificationAccess) && (nlod >0.0)) {
      int si, ti, li, pm4;
      _GLfloat s1, t1;
   /* get hash function of nlod frac */
   li = nlod * 4096.0;
   li = nlod - ((((li & 0x001) << 5) +
                  ((li & 0x004) << 2) +
                  ((li & 0x010) >> 1) +
                  ((li & 0x040) >> 4) +
                  ((li & 0x100) >> 7) +
                  ((li & 0x400) >> 11)) / 64.0);
   /* dither nlod with hash of nlod frac */
   /* don't let fake detail get smaller than a tile */
   pm4 = dtex->p - 4;
   if (pm4 < 0) {
      pm4 = 0;
   }
   if (li > pm4) {
      li = pm4;
   }
```

```
                /* do minification access only for detail texture (when in minification) */
                if (li >= 1) {
                    /* scale to texel address */
                    si = s * (dtex->level[0].width2f * (1 << -det->level));
                    ti = t * (dtex->level[0].height2f * (1 << -det->level));
                    /* lop off nlod's worth of lsbs */
                    si >>= li
                    ti >>= li;
                    /* shift up one */
                    si <<= 1;
                    ti <<= 1;
                    /* "round" to one half */
                    si += 1;
                    ti += 1;
                    /* shift back to original texel address */
                    si <<= li-1;
                    ti <<= li-1;
                    /* offset each nlod from neighbor, so uncorrelated */
                    si -= li 1;
                    ti -= li 1;
                    /* scale back to s,t */
                    s1 = (__GLfloat)si / (dtex->level[0].width2f * (1 << -det->level));
                    t1 = (__GLfloat)ti / (dtex->level[0].height2f * (1 << -det->level));
                    __glNearestDetailSGISFilter2(tex, &tex->level[0], s1, t1, &td1);
                } else {
                    /* XXX replace with non-static filter */
                    __glLinearDetailSGISFilter2(tex, &tex->tevel[0], s, t, &td1);
                }
                /* note: this must be after the detail lod - for test vector gen */
                /* no minificaton access for base level (in magnification!) */
                /* get value from base texture */
                (*tex->linear)(tex, &tex->level[0], s, t, &td);
            } else {
                /* non-mipmapaccess version currently not supported in hardware */
                __glLinearDetailSGISFilter2(tex, &tex->level[0], s, t, &td1);
                /* note: this MUST be after the detail lod - for test vector gen */
                (*tex->linear)(tex, &tex->level[0], s, t, &td);
            }
            f = __glFastEvalDetailTexFuncSGIS(tex, lod, GL_TRUE);
            /* for test vector generation */
            dv_lfrac = f;
/* omf = __glOne - f; */
                switch (det->mode) {
                    case GL__ADD:
                        switch (tex->level[0].baseFormat) {
                            case GL__RGBA:
                                result->alpha = __GL_TEXENV_CLAMP(td.alpha + f * ((2 * __glOne) * td1.alpha - __glOne), __glZero, __glOne);
                                /* FALLTHROUGH */
                            case GL__RGB:
                                result->r = __GL_TEXENV_CLAMP(td.r + f * ((2 * __glOne) * td1.r - __glOne), __glZero, __glOne);
                                result->g = __GL_TEXENV_CLAMP(td.g + f * ((2 * __glOne) * td1.g - __glOne), __glZero, __glOne);
                                result->b = __GL_TEXENV_CLAMP(td.b + f * ((2 * __glOne) * td1.b - __glOne), __glZero, __glOne);
                                break;
                            case GL__ALPHA:
                                result->alpha = __GL_TEXENV_CLAMP(td.alpha + f * ((2 * __glOne) * td1.alpha - __glOne), __glZero, __glOne);
                                break;
                        }
                        break;
                    case GL__MODULATE:
                        switch (tex->level[0].baseFormat) {
                            case GL__RGBA:
                                result->alpha = __GL_TEXENV_CLAMP(td.alpha * (__glOne + f * ((2 * __glOne) * td1.alpha - __glOne)), __glZero, __glOne);
                                /* FALLTHROUGH */
                            case GL__RGB:
                                result->r = __GL_TEXENV_CLAMP(td.r * (__glOne + f * ((2 * __glOne) * td1.r - __glOne)), __glZero, __glOne);
                                result->g = __GL_TEXENV_CLAMP(td.g * (__glOne + f * ((2 * __glOne) * td1.g - __glOne)), __glZero, __glOne);
                                result->b = __GL_TEXENV_CLAMP(td.b * (__glOne + f * ((2 * __glOne) * td1.b - __glOne)), __glZero, __glOne);
                                break;
                            case GL__ALPHA:
                                result->alpha = __GL_TEXENV_CLAMP(td.alpha * (__glOne + f * ((2 * __glOne) * td1.alpha - __glOne)), __glZero, __glOne);
                                break;
                        }
                        break;
                    default:
                        /* throw error */
                        break;
                }
        }
}
```

Figure 12:
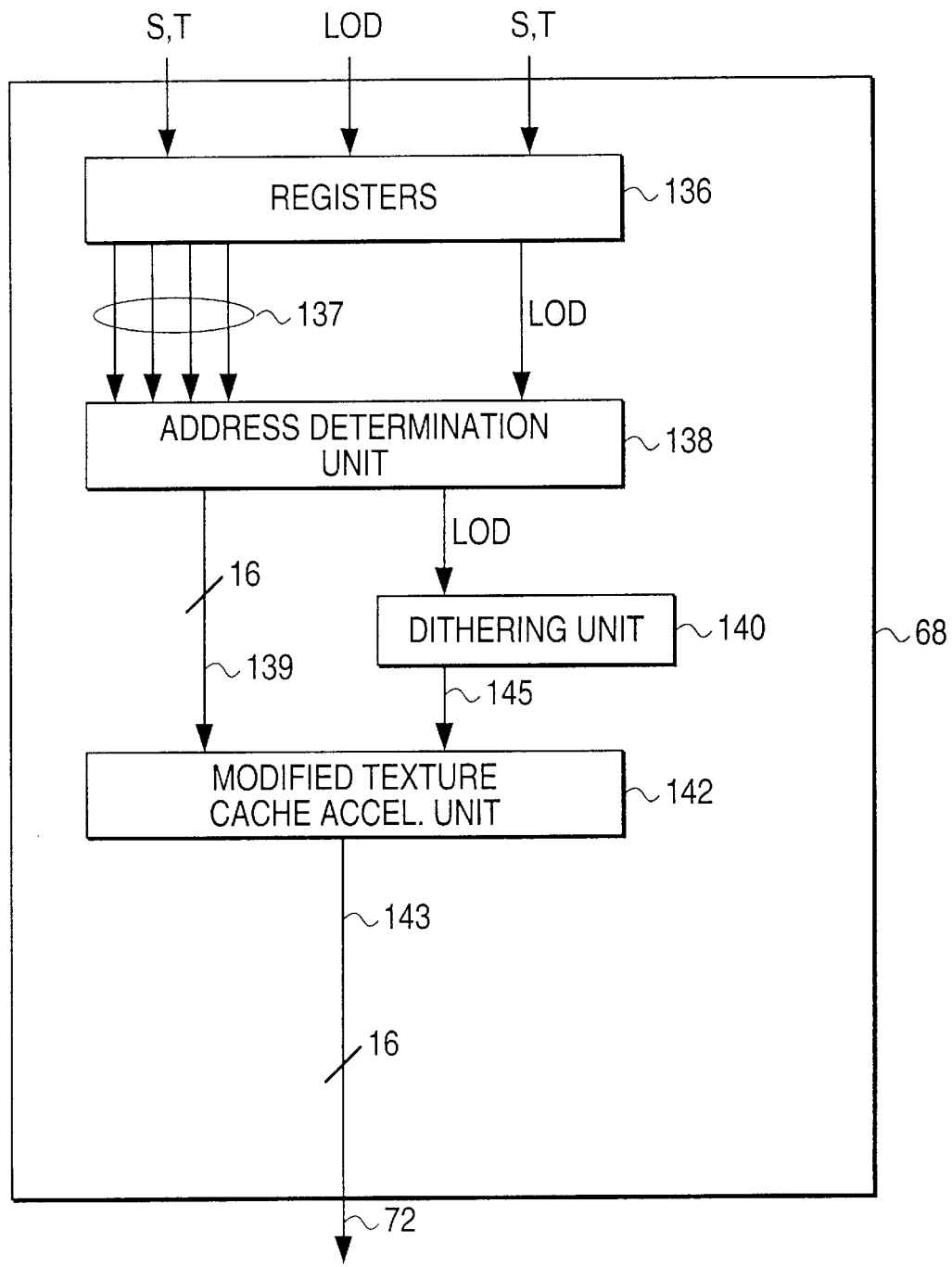
FIG. 12 is a detailed diagram of texture address unit 68 of the present invention.

FIG. 12 is a detailed diagram of address unit 68 of the present invention. As shown in FIG. 12, the s and t coordinates corresponding to the quad of pixels is received in 2 cycles of 2 sets of s and t coordinates each cycle, along with the LOD value, by registers 136. The four sets of s and t coordinates are transmitted along bus 137 and the LOD value is transmitted to the address determination unit 138, in which a texture address is determined based thereon. However, before the texture address is transmitted to the texture cache 74, the texture address is transmitted to minified texture cache acceleration unit 142. In addition, the LOD value is transmitted to dithering unit 140, which dithers the LOD value as described herein above.

Minified texture cache acceleration unit 142 uses the texture address 139 as a starting address, then determines minified texture cache acceleration addresses 145 to be used to access the texture cache 74 in place of the texture address 139. The minified texture cache acceleration addresses 145 are in an adjacent plane orthogonal to the s and t coordinates indexed by the level of detail (LOD), with the LOD value having been dithered by dithering unit 140 and transmitted to the minified texture cache acceleration unit 142 along bus 145. The minified texture cache acceleration addresses 143 are output to the texture cache 74 along bus 72.

A benefit of the features of the present invention is that performance of texture cache access is improved by two orders of magnitude, with the improvement based on the size of the tile being accessed. A larger tile provides a greater performance advantage for the present invention.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A method for accelerating minified texture cache access, said method receiving a level of detail (LOD) value and comprising:

determining by a graphics system starting addresses of textures in corresponding s and t coordinates and levels of detail of the texture, said texture comprising tiles of texels stored in a memory;

reading, for each cache tile, successions of each of the texels of the texture from the memory based on the starting addresses of a first of the succession of texels and the corresponding level of detail (LOD) value, each texel in each succession of texels read having a texture address a distance of $2^{LOD}$ texels from a texture address of a previous texel in the succession of texels for each of the levels of detail, wherein each texel is read from the memory based upon a table entry indicating whether each texel is stored in the texture cache.

2. The method of claim 1, wherein a fake mipmap is constructed in the texture cache based upon the s and t coordinates and the level of detail value.

3. The method of claim 1, wherein the texture is retrieved from the memory based upon the fake mipmap if a texture cache miss is generated.

4. The method of claim 1, wherein the texture address is dithered before being stored in the texture cache.

5. The method of claim 1, wherein a fake mipmap pyramid is faulted into the texture cache based upon each of the successions of texels.

6. The method of claim 1, wherein each $2^{LOD}$ texel is retrieved from the memory and stored in the texture cache for each succession of texels upon a texture cache miss.

7. The method of claim 1, wherein a stride value is determined as $2^{LOD}$ for each of the levels of detail.

8. The method of claim 1, wherein the texture cache comprises a table storing the starting address and the stride value corresponding to each level of detail for each texture stored in the memory and in the texture cache.

9. The method of claim 1, wherein the texture is dithered by hashing a fractional part of the level of detail and adding the hashed, fractional part of the level of detail back to the level of detail.

10. A graphics apparatus coupled to a memory storing textures, said apparatus comprising a texture unit calculating a level of detail (LOD) value, said texture unit comprising:

an address generator generating an address of texels of the texture stored in the memory, said address based upon the texture coordinates and the level of detail, and reading from the memory each texel of a succession of texels having a texture address a distance of $2^{LOD}$ from a texture address of a previous texel in the succession of texels; and a texture cache storing each $2^{LOD}$ texel read from the memory, wherein each texel in the succession of texels is read from the memory based upon a table entry indicating whether each texel is stored in the texture cache.

11. The apparatus according to claim 10, wherein the least significant bits of the address select one of 16 banks of memory of the texture cache.

12. A graphics apparatus determining a level of detail (LOD) value, said apparatus comprising:

a memory storing texels; and means for generating an address of the texels of the texture stored in the memory, said address based upon the texture coordinates and the level of detail, reading from the memory each texel of a succession of texels having a texture address a distance of $2^{LOD}$ from a texture address of a previous texel, and storing each $2^{LOD}$ texel read from the memory, wherein each texel in the succession of texels is read from the memory based upon a table entry indicating whether each texel is stored in the texture cache.

13. An Appartus acording to claim 12, wherein the means for generator comprises an address generator generating the address, and a text cache storing a stride value equal to $2^{LOD}$ and corresponding to each texture.

14. A computer readable medium for controlling a computer to execute a process for accelerating minified texture cache access, said process receiving a level of detail (LOD) value and comprising:

determining by a graphics system starting addresses of textures in corresponding s and t coordinates and levels of detail of the texture, said texture comprising tiles of texels stored in a memory;

reading, for each cache tile, successions of each of the texels of the texture from the memory based on the starting addresses of a first of the succession of texels and the corrsponding level a of (LOD) value, each texel in each succession of texels read having a texture address a distance of $2^{LOD}$ texels from a texture address of a prevvious texel in the succession of texels for each of the levels of detail, wherein each texel is read from the memory based upon a table entry indicating whether each texel is stored in the texture cache.

15. The computer readable medium of claim 14, wherein a fake mipmap is constructed in the texture cache based upon the s and t coordinates and the level of detail value.

16. The computer readable medium of claim 15, wherein the texture is retrieved from the memory based upon the fake mipmap if a texture cache miss is generated.

17. The computer readable medium of claim 14, wherein the texture address is dithered before being stored in the texture cache.

18. The computer readable medium of claim 14, wherein a fake mipmap pyramid is faulted into the texture cache based upon each of the successions of texels.

19. The computer readable medium of claim 14, wherein each $2^{LOD}$ texel is retrieved from the memory and stored in the texture cache for each succession of texels upon a texture cache miss.

20. The computer readable medium of claim 14, wherein a stride value is determined as $2^{LOD}$ for each of the levels of detail.

21. The computer readable medium of claim 14, wherein the texture cache comprises a table storing the starting address and the stride value corresponding to each level of detail for each texture stored in the memory and in the texture cache.

22. The computer readable medium of claim 14, wherein the texture is dithered by hashing a fractional part of the level of detail and adding the hashed, fractional part of the level of detail back to the level of detail.

* * * * *

UNITED STATES PATENT AND TRADEMARK OFFICE
CERTIFICATE OF CORRECTION

PATENT NO. : 6,104,415
DATED : August 15, 2000
INVENTOR(S) : Carroll P. GOSSETT

Page 1 of 2

It is certified that error appears in the above-identified patent and that said Letters Patent is hereby corrected as shown below:

Col. 2, line 50, change "GI," to --GL--.
Col. 3, lines 38-39, change "TEXTURE¯WRAP¯S or TEXTURE¯WRAP¯T" to --TEXTURE_WRAP_S or TEXTURE_WRAP_T--; and
   line 60, change "$\Xi\log_2$" to -- $\equiv\log_2$--.
Col. 4, line 1, change "$v(x,y)\equiv 0$)" to --$v(x,y)\equiv 0$)--;
   line 22, change "$\rho\restriction 1$" to --$\rho\equiv 1$--; and
   line 51, change "TEXTURE¯WRAP¯S" to --TEXTURE_WRAP_S--.
Col. 6, line 22, change "MIPMAP¯NEAREST" TO --MIPMAP_NEAREST--;
   line 29, change "MIPMAP¯NEAREST" TO --MIPMAP_NEAREST--;
   line 30, change "MIPMAP¯LINEAR" TO --MIPMAP_LINEAR--;
   line 40, change "MIPMAP¯LINEAR" TO --MIPMAP_LINEAR--;
   line 41, change "MIPMAP¯LINEAR" TO --MIPMAP_LINEAR--;
   line 57, change "NEARESτ_MIPMAP¯NEAREST" to --NEAREST_MIPMAP_NEAREST--; and
   lines 57-58, change "NEARESτ_MIPMAP¯LINEAR" to --NEAREST_MIPMAP_LINEAR--.
Col. 8, line 59, delete ",".

UNITED STATES PATENT AND TRADEMARK OFFICE
CERTIFICATE OF CORRECTION

PATENT NO. : 6,104,415
DATED : August 15, 2000
INVENTOR(S) : Carroll P. GOSSETT

It is certified that error appears in the above-identified patent and that said Letters Patent is hereby corrected as shown below:

Col. 10, line 57, change "102)" to --102--.
Col. 14, line 45, change "$108_1$," to --$108_{10}$--.
Col. 15, line 7, change "x-Y" to --X-Y--.
Col. 17, line 9, change "75-1" to --113-1--; and
   line 11, change "75-2" to --113-2--.
Col. 18, line 25, after "50." start with new paragraph and change "mipmap" to --Mipmap--; and
   in equation after below, line 13, delete "g" at the end of line.
Col. 27, line 60, change "claim 1" to --claim 2--.
Col. 28, line 47, change "generator" to --generating--.

Signed and Sealed this

First Day of May, 2001

Attest:

NICHOLAS P. GODICI

Attesting Officer    Acting Director of the United States Patent and Trademark Office